(12) United States Patent
Sakoh et al.

(10) Patent No.: US 12,479,956 B2
(45) Date of Patent: Nov. 25, 2025

(54) FLUOROPOLYETHER-GROUP-CONTAINING POLYMER, SURFACE TREATMENT AGENT, AND ARTICLE

(71) Applicant: SHIN-ETSU CHEMICAL CO., LTD., Tokyo (JP)

(72) Inventors: Ryusuke Sakoh, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 763 days.

(21) Appl. No.: 17/633,622

(22) PCT Filed: Jul. 20, 2020

(86) PCT No.: PCT/JP2020/028067
§ 371 (c)(1),
(2) Date: Feb. 8, 2022

(87) PCT Pub. No.: WO2021/029187
PCT Pub. Date: Feb. 18, 2021

(65) Prior Publication Data
US 2022/0325042 A1    Oct. 13, 2022

(30) Foreign Application Priority Data

Aug. 9, 2019   (JP) ................. 2019-147457

(51) Int. Cl.
*C08G 65/00*  (2006.01)
*C08G 65/336* (2006.01)
*C09D 171/00* (2006.01)
*C09K 3/18*   (2006.01)

(52) U.S. Cl.
CPC ......... *C08G 65/007* (2013.01); *C08G 65/336* (2013.01); *C09D 171/00* (2013.01); *C09K 3/18* (2013.01); *C08G 2650/48* (2013.01)

(58) Field of Classification Search
CPC .... C08G 65/336; C08G 65/007; C08G 77/46; C08G 77/24; C08G 2650/48; C08L 71/00; C09D 4/00; C09D 171/00; C08K 5/5419; C09K 3/18
See application file for complete search history.

(56) References Cited

U.S. PATENT DOCUMENTS

| | | |
|---|---|---|
| 2009/0208728 A1 | 8/2009 | Itami et al. |
| 2009/0216035 A1 | 8/2009 | Itami et al. |
| 2012/0077041 A1 | 3/2012 | Yamane et al. |
| 2013/0136928 A1 | 5/2013 | Yamane et al. |
| 2013/0303689 A1 | 11/2013 | Sato et al. |
| 2015/0274889 A1 | 10/2015 | Sakoh et al. |

FOREIGN PATENT DOCUMENTS

| | | |
|---|---|---|
| JP | 2008-534696 A | 8/2008 |
| JP | 2008-537557 A | 9/2008 |
| JP | 2012-72272 A | 4/2012 |
| JP | 2012-157856 A | 8/2012 |
| JP | 2013-136833 A | 7/2013 |
| JP | 2015-199906 A | 11/2015 |
| WO | WO 2017/061235 A1 | 4/2017 |
| WO | WO 2019/039226 A1 | 2/2019 |
| WO | WO 2020/111010 A1 | 6/2020 |
| WO | WO 2020/166488 A1 | 8/2020 |

OTHER PUBLICATIONS

International Search Report, issued in PCT/JP2020/028067, PCT/ISA/210, dated Oct. 13, 2020.
Written Opinion of the International Searching Authority, issued in PCT/JP2020/028067, PCT/ISA/237, dated Oct. 13, 2020.

*Primary Examiner* — Shane Fang
(74) *Attorney, Agent, or Firm* — Birch, Stewart, Kolasch & Birch, LLP

(57) ABSTRACT

A surface treatment agent that comprises a fluoropolyether-group-containing polymer represented by general formula (1), which has a hydroxylated silyl group or a hydrolyzable silyl group, and/or a product of partial (hydrolytic) condensation of the polymer. The surface treatment agent is capable of forming cured coating films which are excellent in terms of water and oil repellency and resistance to wear by steel wool and have a small water-sliding angle.

$$Rf-[CH(V)_2]_\alpha \quad \text{Formula (1):}$$

(In the formula, Rf is a mono- or divalent residue of a polymer including a fluorooxyalkylene group, the V moieties each independently are a monovalent group having a hydroxylated silyl group or hydrolyzable silyl group at the end and having no polar group besides the hydroxylated silyl group or hydrolyzable silyl group, and $\alpha$ is 1 or 2.).

18 Claims, No Drawings

FLUOROPOLYETHER-GROUP-CONTAINING POLYMER, SURFACE TREATMENT AGENT, AND ARTICLE

TECHNICAL FIELD

This invention relates to a fluoropolyether-containing polymer (or compound having a mono- or divalent fluorooxyalkylene-containing polymer residue in the molecule), and more particularly, to a fluoropolyether-containing polymer capable of forming a coating having improved water/oil repellency and abrasion resistance, a surface treating agent comprising the polymer and/or a partial (hydrolytic) condensate thereof, and an article having a surface treated with the surface treating agent.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an annually increasing need for the technology to attain fingerprint proofness or easy stain removal on a display surface for better appearance or visibility. It is thus desired to have a material capable of meeting these requirements. In particular, for touch panel displays which are readily stained with fingerprints, it is desirable to form a water/oil repellent layer on their surface. Prior art water/oil repellent layers have high water/oil repellency and easy stain wipe-off, but suffer from the problem that the antifouling performance deteriorates during service.

Generally, fluoropolyether-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. The hydrolyzable silyl groups form chemical and physical bonds with the surface of glass or metal, whereby the coating becomes a tough coating having durability.

Patent Documents 1 to 6 (JP-A 2008-534696, JP-A 2008-537557, JP-A 2012-072272, JP-A 2012-157856, JP-A 2013-136833, JP-A 2015-199906) disclose a composition comprising a fluoropolyether-containing polymer which is obtained by introducing a hydrolyzable silyl group into a fluoropolyether-containing compound, the composition being tightly adherent to the substrate surface and capable of forming a coating with water/oil repellency, chemical resistance, lubricity, parting, antifouling and other properties on the substrate surface.

When lenses and antireflective coatings are surface treated with a composition comprising the fluoropolyether-containing polymer obtained by introducing a hydrolyzable silyl group into a fluoropolyether-containing compound, the cured coatings are improved in durability to abrasion with steel wool, but have a large water sliding angle as a result of durability improvement. A small water sliding angle indicates poor abrasion durability.

PRIOR ART DOCUMENTS

Patent Documents

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833
Patent Document 6: JP-A 2015-199906

SUMMARY OF INVENTION

Technical Problem

An object of the invention, which has been made under the above-mentioned circumstances, is to provide a fluoropolyether-containing polymer capable of forming a cured film having improved water/oil repellency and abrasion resistance, a surface treating agent comprising the polymer and/or a partial (hydrolytic) condensate thereof, and an article having a surface treated with the surface treating agent.

Solution to Problem

Making extensive investigations to attain the above object, the inventors have found that among the foregoing fluoropolyether-containing polymers, a fluoropolyether-containing polymer having a hydroxy-containing silyl group or hydrolyzable silyl group, represented by the general formula (1), shown below, especially a fluoropolyether-containing polymer having a hydroxy-containing silyl group or hydrolyzable silyl group, represented by the general formula (2), shown below, is effective in that a surface treating agent comprising the polymer and/or a partial (hydrolytic) condensate thereof is capable of forming a cured coating having improved water/oil repellency, improved steel wool abrasion resistance, and a small water sliding angle. The present invention is predicated on this finding.

Accordingly, the invention provides a fluoropolyether-containing polymer (or compound having a mono- or divalent fluorooxyalkylene-containing polymer residue in the molecule), a surface treating agent, and an article as defined below.

[1]
A fluoropolyether-containing polymer having the general formula (1):

$$Rf-[CH(V)_2]_\alpha \qquad (1)$$

wherein Rf is a mono- or divalent fluorooxyalkylene-containing polymer residue, V is independently a monovalent group having a hydroxy-containing silyl group or hydrolyzable silyl group at an end, but not any polar group other than the hydroxy-containing silyl group and hydrolyzable silyl group, and $\alpha$ is 1 or 2.

[2]
The fluoropolyether-containing polymer of [1], having the general formula (2):

[Chem. 1]

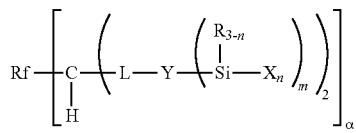

(2)

wherein Rf is a mono- or divalent fluorooxyalkylene-containing polymer residue, L is each independently a single bond or divalent heteroatom, Y is each independently a di- to hexavalent hydrocarbon group which may contain a silicon atom and/or siloxane bond, R is independently $C_1$-$C_4$ alkyl or phenyl, X is independently a hydroxy or hydrolyzable group, n is an integer of 1 to 3, m is an integer of 1 to 5, and α is 1 or 2.

[3]
The fluoropolyether-containing polymer of [1] or [2] wherein in formula (1) or (2), α is 1, and Rf is a group having the general formula (3):

[Chem. 2]

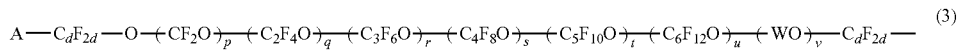

(3)

wherein A is fluorine, hydrogen, fluoroalkyl group or fluoroalkyl group containing at least one hydrogen atom, W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

[4]
The fluoropolyether-containing polymer of [1] or [2] wherein in formula (1) or (2), α is 2, and Rf is a group having the general formula (4):

[Chem. 3]

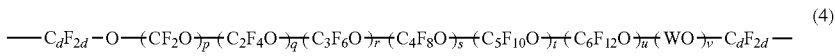

(4)

wherein W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

[5]
The fluoropolyether-containing polymer of any one of [2] to [4] wherein in formula (2), two L are present at one end of the molecular chain when α=1, and two L are present at each of opposite ends of the molecular chain when α=2; one L at each end of the molecular chain is an oxygen atom, and the other L is a single bond, and Y is each independently a group selected from the group consisting of a $C_3$-$C_{10}$ alkylene group, an alkylene group containing $C_6$-$C_8$ arylene, a divalent group having alkylene moieties bonded via a silalkylene structure or silarylene structure, a di- to tetravalent group having a $C_2$-$C_{10}$ alkylene moiety bonded to the valence bond of a di- to tetravalent linear organopolysiloxane residue of 2 to 10 silicon atoms, and a di- to tetravalent group having a $C_2$-$C_{10}$ alkylene moiety bonded to the valence bond of a di- to tetravalent branched or cyclic organopolysiloxane residue of 3 to 10 silicon atoms.

[6]

The fluoropolyether-containing polymer of any one of [2] to [5] wherein in formula (2), X is each independently selected from the group consisting of hydroxy, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

[7]

The fluoropolyether-containing polymer of any one of [2] to [6] wherein the polymer having formula (2) is selected from those polymers having the following formulae:

[Chem. 4]

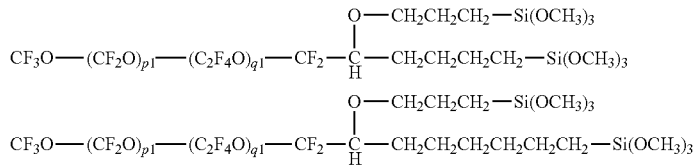

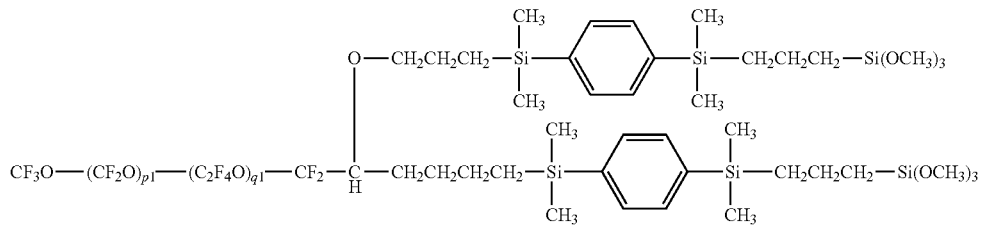

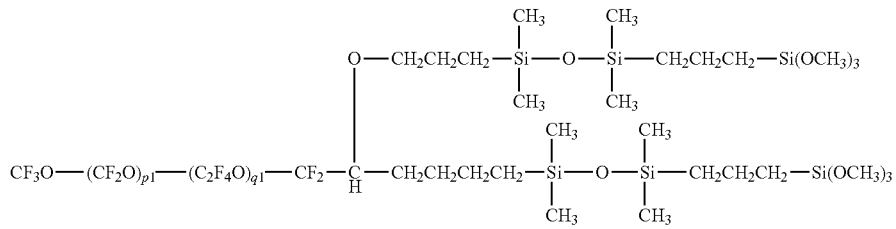

[Chem. 5]

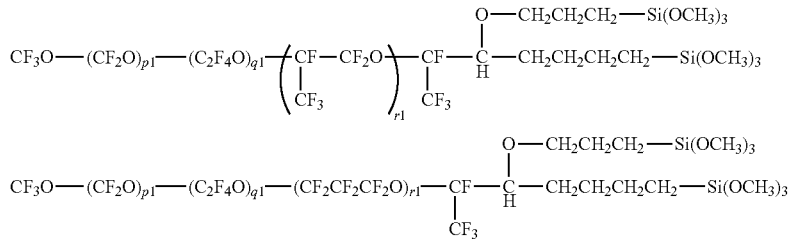

[Chem. 6]

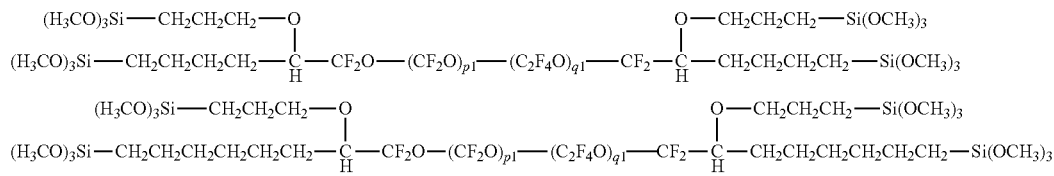

-continued

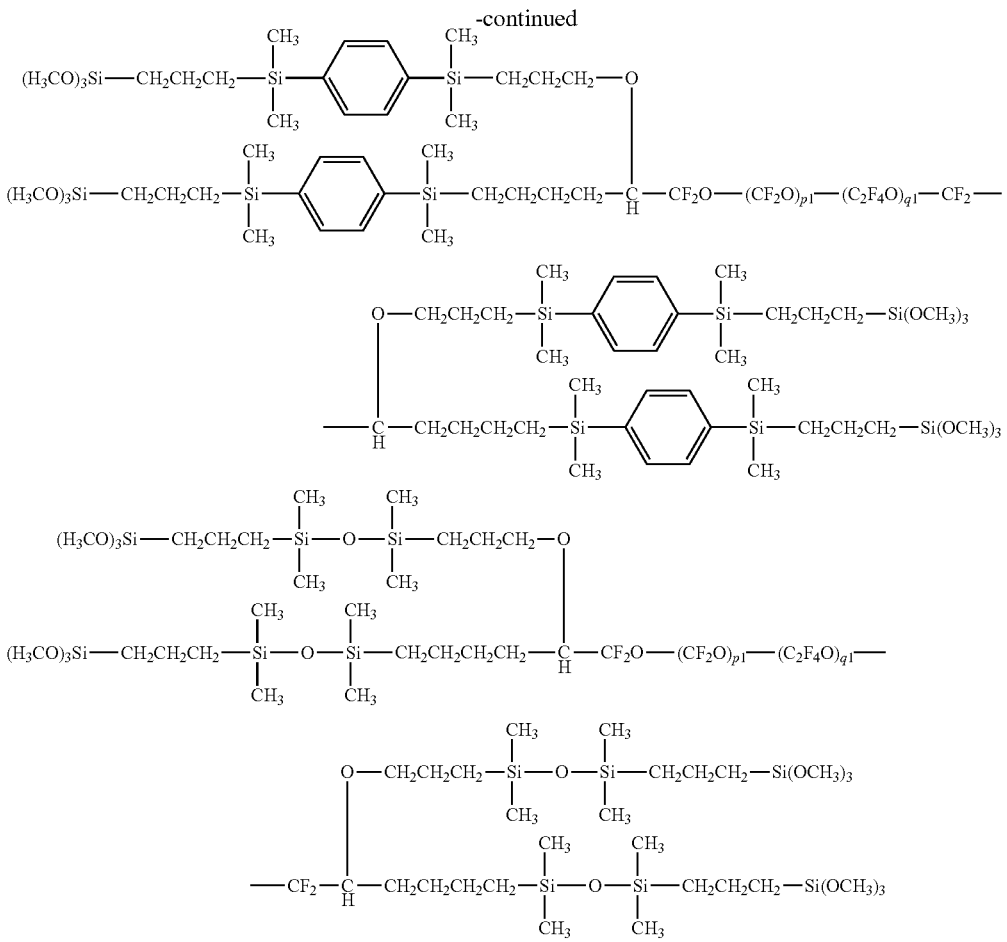

[Chem. 7]

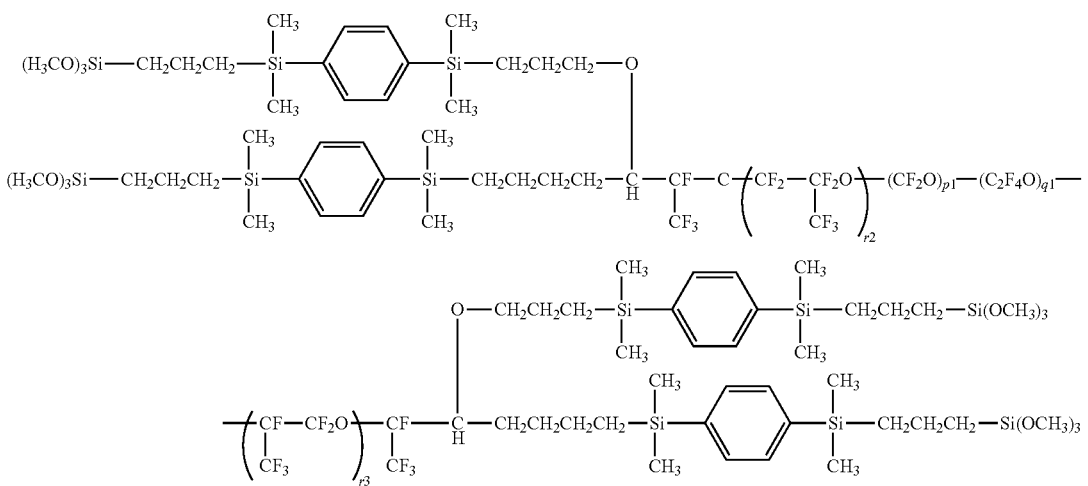

wherein p1 is an integer of 5 to 100, q1 is an integer of 5 to 100, r1 is an integer of 1 to 100, r2 is an integer of 1 to 99, r3 is an integer of 1 to 99, the sum of p1, q1, r1, r2 and r3 is an integer of 10 to 110, and individual repeating units within the parentheses with p1, q1, r1, r2, and r3 may be randomly bonded.

[8]

A surface treating agent comprising the fluoropolyether-containing polymer of any one of [1] to [7] and/or a partial (hydrolytic) condensate thereof.

[9]

The surface treating agent of [8] wherein the fluoropolyether group in the fluoropolyether-containing polymer is a monovalent fluorooxyalkylene-containing polymer residue at a molecular chain end.

[10]

An article having a surface treated with the surface treating agent of [8] or [9].

Advantageous Effects of Invention

The fluoropolyether-containing polymer of the invention is improved in substrate adhesion and wettability. An article which is surface treated with a surface treating agent comprising the polymer and/or a partial (hydrolytic) condensate thereof is improved in water/oil repellency, steel wool abrasion resistance, and water sliding.

DESCRIPTION OF EMBODIMENTS

The invention provides a fluoropolyether-containing polymer having a fluoropolyether group and a reactive functional group in the molecule, represented by the general formula (1). The fluoropolyether-containing polymer may be used alone or in admixture of two or more.

$$Rf—[CH(V)_2]_\alpha \tag{1}$$

Herein Rf is a mono- or divalent fluorooxyalkylene-containing polymer residue, V is independently a monovalent group having a hydroxy-containing silyl group or hydrolyzable silyl group at an end, but not any polar group other than the hydroxy-containing silyl group and hydrolyzable silyl group, and $\alpha$ is 1 or 2.

As used herein, the term "about (a value)" is a numerical value (approximate value) obtained by counting fractions over ½ as one and disregarding the rest, and when the lowest digit of the numerical value described is not "0", includes a numerical value range in which the numerical value described is reached by counting fractions of the digit below the lowest digit over ½ as one and disregarding the rest. For example, "about 3 equivalents" implies a range from 2.5 equivalents to 3.4 equivalents, and "about 0.02 equivalent" implies a range from 0.015 equivalent to 0.024 equivalent. When the lowest digit of the numerical value described is "0", the term "about (a value)" includes a numerical value range in which the numerical value described is reached by counting fractions of the lowest digit over ½ as one and disregarding the rest. For example, "about 50° C." implies a range from 45° C. to 54° C., and "about 200 to 350 parts by weight" implies a range from 195 parts by weight to 354 parts by weight.

The fluoropolyether-containing polymer of the invention is of the structure that a monovalent fluorooxyalkyl or divalent fluorooxyalkylene group (i.e., mono- or divalent fluorooxyalkylene-containing polymer residue) and a hydrolyzable silyl group such as alkoxysilyl or hydroxy-containing silyl group are bonded via a linking group not having a polar group, and has at least two hydrolyzable silyl groups such as alkoxysilyl or hydroxy-containing silyl groups in the molecule, but not any polar groups (specifically hydroxy groups) other than the hydrolyzable silyl groups and hydroxy-containing silyl groups in the molecule. Because of this structure, the polymer is improved in substrate adhesion and wettability and exhibits excellent water/oil repellency, steel wool abrasion resistance, and water sliding.

In formula (1), Rf is a mono- or divalent fluorooxyalkylene-containing polymer residue, which is preferably a monovalent fluoropolyether group having the general formula (3) below when $\alpha$ is 1 (i.e., Rf is a monovalent fluorooxyalkylene-containing polymer residue), or a divalent fluoropolyether group having the general formula (4) below when $\alpha$ is 2 (i.e., Rf is a divalent fluorooxyalkylene-containing polymer residue).

[Chem. 8]

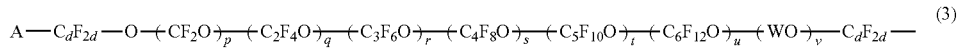
(3)

[Chem. 9]

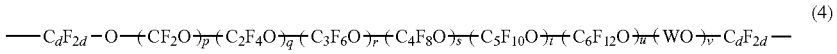
(4)

Herein, A is fluorine, hydrogen, fluoroalkyl group or fluoroalkyl group containing at least one hydrogen atom, W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

In formula (3), A is fluorine, hydrogen, fluoroalkyl group or fluoroalkyl group containing at least one hydrogen atom. The fluoroalkyl group or fluoroalkyl group containing at least one hydrogen atom is preferably of 1 to 6 carbon atoms, and examples thereof include —$CF_3$, —$CF_2CF_3$, and —$CF_2CF_2CF_3$ groups, and the foregoing groups in which one or two fluorine atoms are substituted by hydrogen. A is preferably fluorine.

In formulae (3) and (4), W is a $C_1$-$C_6$ fluoroalkylene group containing at least one hydrogen atom, examples of which include perfluoroalkylene groups such as $CF_2$, $C_2F_4$, $C_3F_6$, $C_4F_8$, $C_5F_{10}$ and $C_6F_{12}$ units in which one or two fluorine atoms are substituted by hydrogen.

In formulae (3) and (4), d is independently for each unit an integer of 1 to 3, preferably 1 or 2.

Also, p, q, r, s, t, u and v each are an integer of 0 to 200, preferably p is an integer of 5 to 100, q is an integer of 5 to 100, r is an integer of 0 to 100, s is an integer of 0 to 100, t is an integer of 0 to 100, u is an integer of 0 to 100, v is an integer of 0 to 100, p+q+r+s+t+u+v is 3 to 200, preferably 10 to 105, more preferably p+q is an integer of 10 to 105, especially 15 to 60, and r=s=t=u=v=0. When p+q+r+s+t+u+v is not more than the upper limit, adhesion and curability are satisfactory, and when the same is not less than the lower limit, the characteristics of fluoropolyether group are fully developed.

In formulae (3) and (4), each unit may be linear or branched. Also, individual repeating units within the parentheses with p, q, r, s, t, u and v may be randomly bonded.

Examples of Rf are shown below.

[Chem. 10]

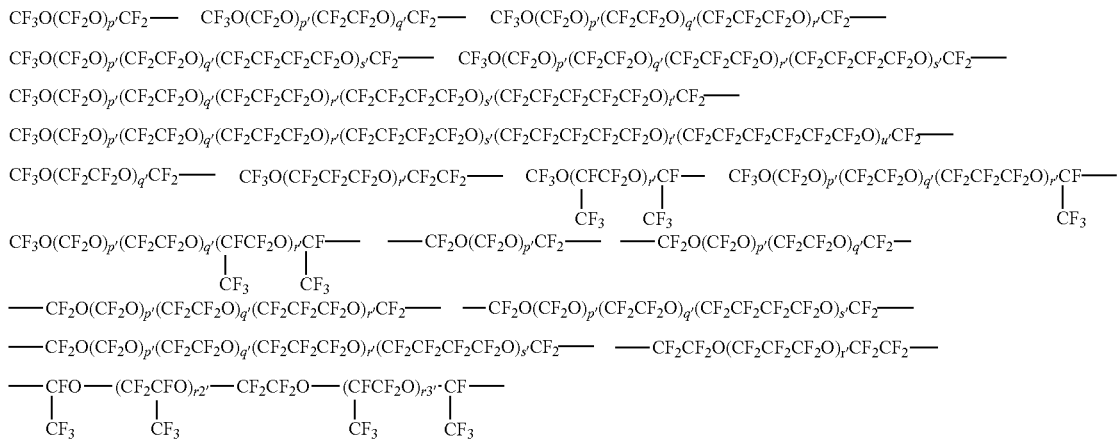

Herein, p', q', r', s', t', and u' each are an integer of at least 1, their upper limit is the same as the upper limit of p, q, r, s, t, and u, and the sum of p', q', r', s', t', and u' is 3 to 200; r2' and r3' each are an integer of at least 1, and the sum of r2' and r3' is 2 to 199. Also, individual repeating units within the parentheses with p', q', r', s', t', and u' may be randomly bonded.

In formula (1), V is independently a monovalent group having a hydroxy-containing silyl group or hydrolyzable silyl group at an end, but not any polar group other than the hydroxy-containing silyl group and hydrolyzable silyl group, preferably a monovalent group consisting of a terminal hydroxy-containing silyl group or terminal hydrolyzable silyl group and a polar moiety-free linking group for linking the silyl group to the CH group, more preferably a monovalent organic group having a plurality of silicon-bonded hydroxy groups or hydrolyzable groups incorporated at the end. Examples of V are groups having the following formulae (5a) to (5e).

[Chem. 11]

(5a)

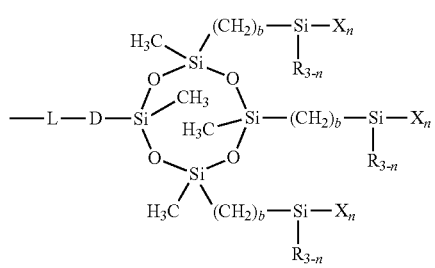

(5b)

-continued $$—L—D—\underset{\underset{CH_3}{|}}{\overset{\overset{CH_3}{|}}{Si}}—(CH_2)_a—\underset{\underset{CH_3}{|}}{\overset{\overset{CH_3}{|}}{Si}}—(CH_2)_b—\underset{\underset{R_{3-n}}{|}}{\overset{}{Si}}—X_n \quad (5c)$$

$$—L—D—\underset{\underset{CH_3}{|}}{\overset{\overset{CH_3}{|}}{Si}}—\underset{}{\overset{}{\bigcirc}}—\underset{\underset{CH_3}{|}}{\overset{\overset{CH_3}{|}}{Si}}—(CH_2)_b—\underset{\underset{R_{3-n}}{|}}{\overset{}{Si}}—X_n \quad (5d)$$

$$—L—D—\left(\underset{\underset{CH_3}{|}}{\overset{\overset{CH_3}{|}}{Si}}—O\right)_c—\underset{\underset{CH_3}{|}}{\overset{\overset{CH_3}{|}}{Si}}—(CH_2)_b—\underset{\underset{R_{3-n}}{|}}{\overset{}{Si}}—X_n \quad (5e)$$

Herein, L is a single bond or divalent heteroatom, D is a $C_1$-$C_{20}$ divalent organic group which may be fluorinated, R is each independently $C_1$-$C_4$ alkyl group or phenyl group, X is each independently a hydroxy group or hydrolyzable group, n is an integer of 1 to 3, "a" is an integer of 2 to 6, b is independently an integer of 2 to 8, and c is an integer of 1 to 50.

In formulae (5a) to (5e), L is a single bond or divalent heteroatom. Exemplary of the divalent heteroatom are oxygen, nitrogen and sulfur. It is desired that of two carbon-bonded V in formula (1), one L is a single bond and the other L is a divalent heteroatom.

In formulae (5a) to (5e), D is a $C_1$-$C_{20}$, preferably $C_2$-$C_8$ divalent organic group which may be fluorinated, desirably a $C_1$-$C_{20}$, more desirably $C_2$-$C_8$ divalent hydrocarbon group which may be fluorinated. Examples of the divalent hydrocarbon group include alkylene groups such as methylene, ethylene, propylene (trimethylene, methylethylene), butylene (tetramethylene, methylpropylene), hexamethylene, and octamethylene, arylene groups such as phenylene, or combinations of at least two of the foregoing (e.g., alkylene-arylene groups), and substituted forms of the foregoing in which some or all of the hydrogen atoms are substituted by fluorine atoms. D is preferably ethylene, propylene, butylene, hexamethylene or phenylene.

In formulae (5a) to (5e), R is a $C_1$-$C_4$ alkyl group such as methyl, ethyl, propyl or butyl, or a phenyl group. Inter alia, methyl is preferred.

X is each independently a hydroxy or hydrolyzable group. Exemplary groups of X include hydroxy, $C_1$-$C_{10}$ alkoxy groups such as methoxy, ethoxy, propoxy, isopropoxy, and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo or iodo. Inter alia, methoxy, ethoxy, isopropenoxy and chloro are preferred.

In formulae (5a) to (5e), n is an integer of 1 to 3, preferably 2 or 3, and n is most preferably 3 from the standpoints of reactivity and substrate adhesion. The subscript "a" is an integer of 2 to 6, preferably 2 to 4, b is independently an integer of 2 to 8, preferably 2 to 4, and c is an integer of 1 to 50, preferably 1 to 9.

Examples of V are shown below.

[Chem. 12]

—O—$CH_2CH_2CH_2$—$Si(OCH_3)_3$

—O—$CH_2CH_2CH_2CH_2$—$Si(OCH_3)_3$

—$CH_2CH_2CH_2CH_2$—$Si(OCH_3)_3$

—$CH_2CH_2CH_2CH_2CH_2$—$Si(OCH_3)_3)_3$

—$CH_2CH_2CH_2CH_2CH_2CH_2$—$Si(OCH_3)_3$

[Chem. 13]

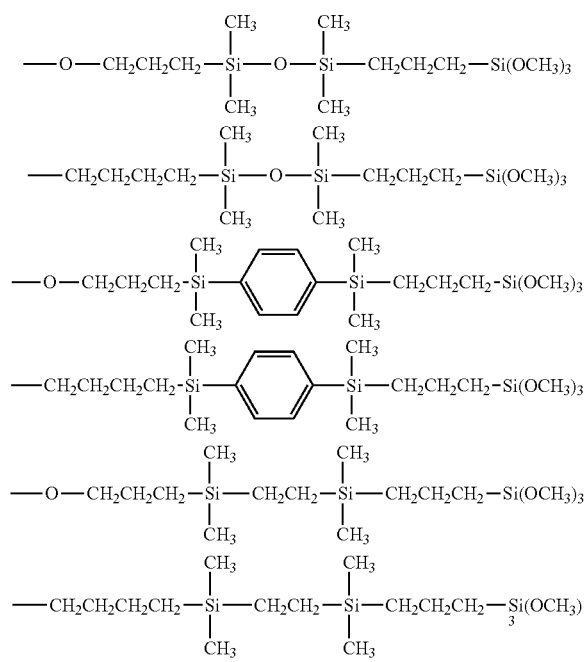

In formula (1), α is 1 or 2, preferably 1.

More preferably, the fluoropolyether-containing polymer is represented by the general formula (2):

[Chem. 14]

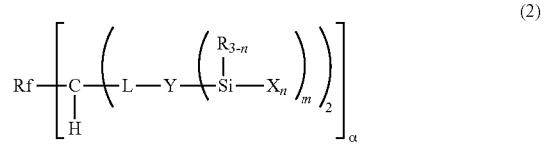

wherein Rf, L, R, X, n and a are as defined above, Y is each independently a di- to hexavalent hydrocarbon group which may contain a silicon atom and/or siloxane bond, and m is an integer of 1 to 5.

In formula (2), L is each independently a single bond or divalent heteroatom as previously mentioned. Exemplary of the divalent heteroatom are oxygen, nitrogen and sulfur. Of two L at each end of the molecular chain (that is, two L at one end of the molecular chain in case of α=1, and two L at each of dual ends of the molecular chain (four L per molecule) in case of α=2), it is desired that at each end of the molecular chain, one L is oxygen and the other L is a single bond.

In formula (2), Y is each independently a di- to hexavalent, preferably di- to tetravalent, most preferably divalent hydrocarbon group which may contain a silicon atom and/or siloxane bond. Because of the exclusion of a polar group from Y, a coating film having satisfactory water sliding is available.

Specifically, Y is a $C_3$-$C_{10}$ alkylene group such as propylene, butylene or hexamethylene, an alkylene group containing $C_6$-$C_8$ arylene like phenylene (e.g., alkylene-arylene groups of 8 to 16 carbon atoms), a divalent group having alkylene moieties bonded via a silalkylene structure or silarylene structure, or a di- to hexavalent group having a $C_2$-$C_{10}$ alkylene moiety bonded to the valence bond of a di- to hexavalent linear, branched or cyclic organopolysiloxane residue of 2 to 10 silicon atoms, preferably 2 to 5 silicon atoms; preferably a $C_3$-$C_{10}$ alkylene group, an alkylene group containing phenylene, a divalent group having alkylene moieties bonded via a silalkylene or silarylene structure, a di- to tetravalent group having a $C_2$-$C_{10}$ alkylene moiety bonded to the valence bond of a di- to tetravalent linear organopolysiloxane residue of 2 to 10 silicon atoms, or a di- to tetravalent group having a $C_2$-$C_{10}$ alkylene moiety bonded to the valence bond of a di- to tetravalent branched or cyclic organopolysiloxane residue of 3 to 10 silicon atoms; most preferably a $C_3$-$C_6$ alkylene group.

The silalkylene or silarylene structure is exemplified by the following structure.

[Chem. 15]

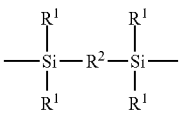

Herein $R^1$ which may be the same or different is a $C_1$-$C_4$ alkyl group such as methyl, ethyl, propyl or butyl, or a $C_6$-$C_{10}$ aryl group such as phenyl. $R^2$ is a $C_1$-$C_4$ alkylene group such as methylene, ethylene, or propylene (trimethylene, methylethylene), or a $C_6$-$C_{10}$ arylene group such as phenylene.

Examples of the di- to hexavalent linear, branched or cyclic organopolysiloxane residue of 2 to 10 silicon atoms, preferably 2 to 5 silicon atoms are shown below.

[Chem. 16]

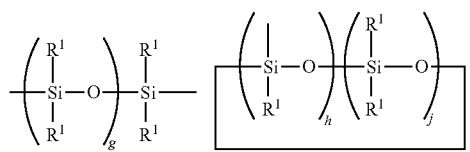

[Chem. 17]

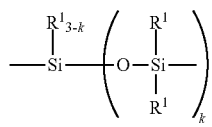

Herein R¹ is as defined above, g is an integer of 1 to 9, preferably 1 to 4, h is an integer of 2 to 6, preferably 2 to 4, j is an integer of 0 to 8, preferably 0 or 1, h+j is an integer of 3 to 10, preferably 3 to 5, and k is an integer of 1 to 3, preferably 2 or 3.

Exemplary of Y are groups as shown below.

[Chem. 18]

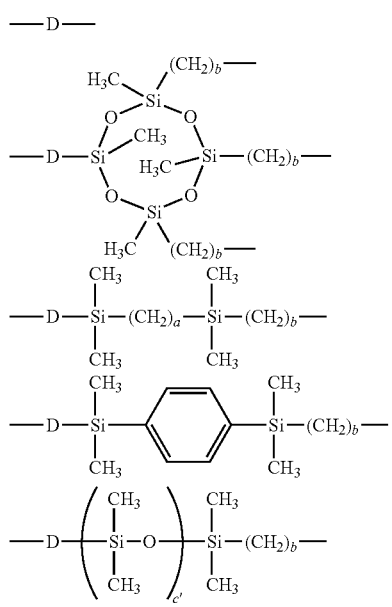

Herein D, a and b are as defined above, and c' is an integer of 1 to 9.

Illustrative examples of Y include the following groups.

[Chem. 19]

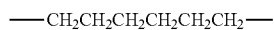
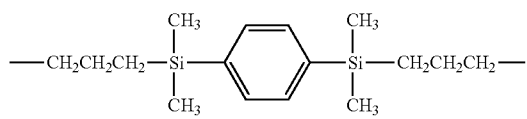

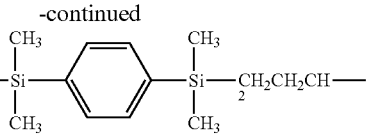

[Chem. 20]

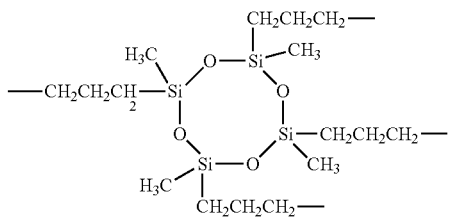

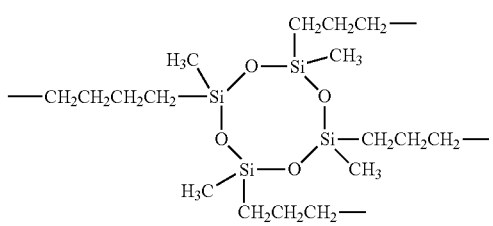

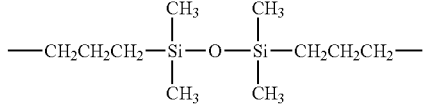

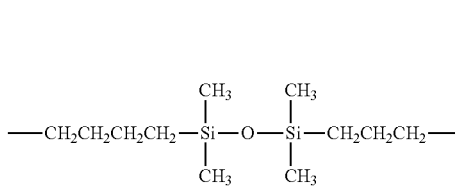

In formula (2), m is an integer of 1 to 5. If m is less than 1, substrate adhesion is low. If m is 6 or more, a terminal alkoxy value becomes too high and adversely affects performance. Preferably m is an integer of 1 to 3, most preferably 1.

Examples of the fluoropolyether-containing polymer having formula (2) include those polymers of the following formulae. In each formula, the number of repetition (or degree of polymerization) of repeating units that constitute the fluorooxyalkyl group or fluorooxyalkylene group (mono- or divalent fluorooxyalkylene-containing polymer residue) is shown below, although it may be an arbitrary number that satisfies the above formulae (3) and (4).

[Chem. 21]
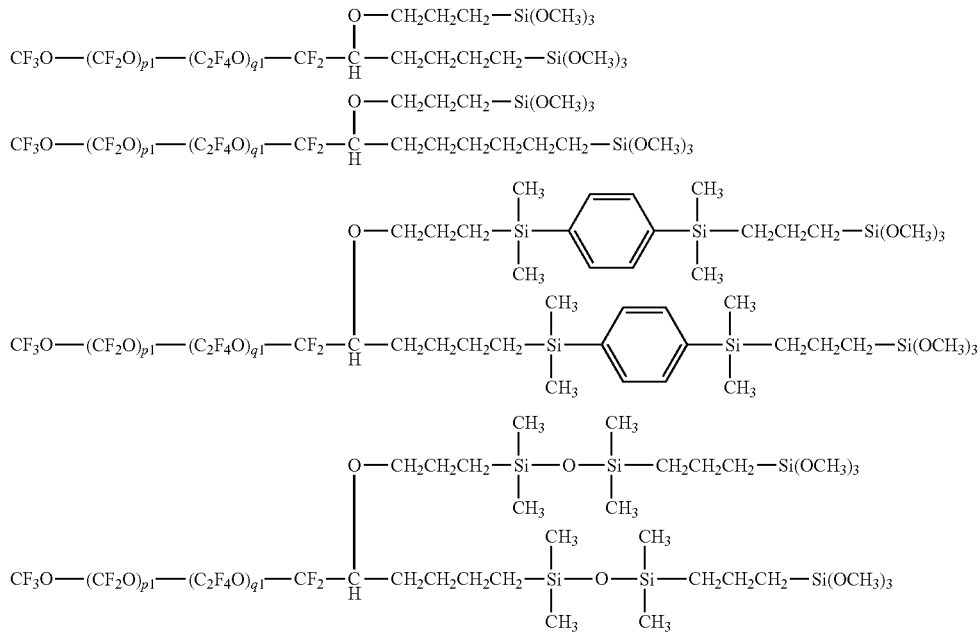
[Chem. 22]
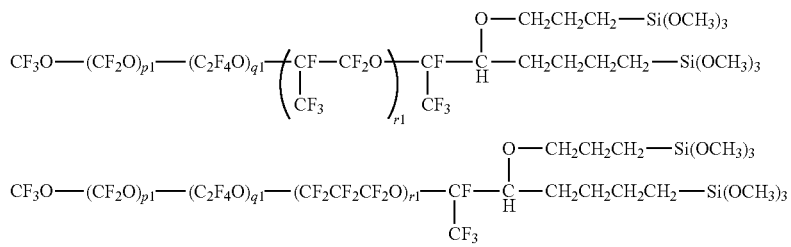
[Chem. 23]
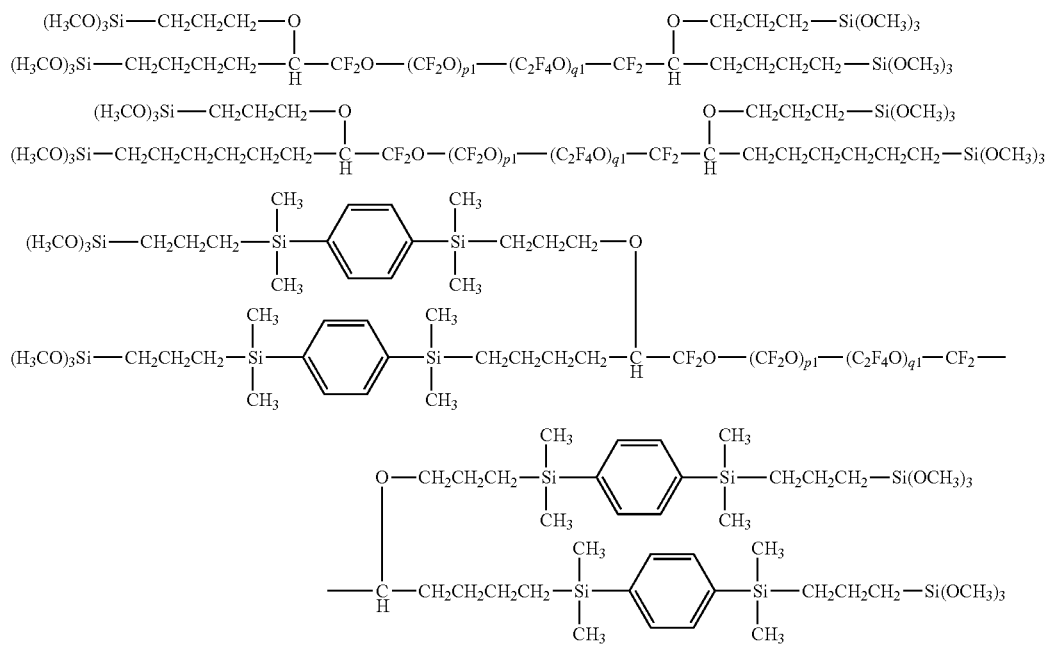

-continued

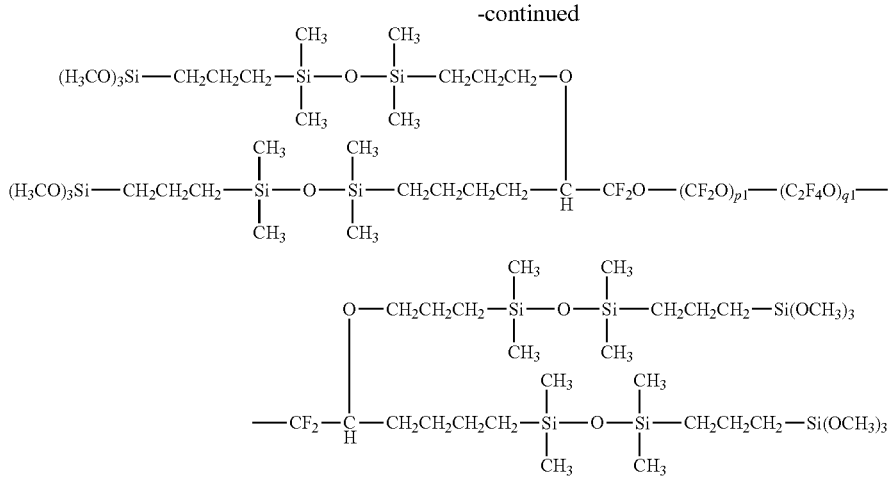

[Chem. 24]

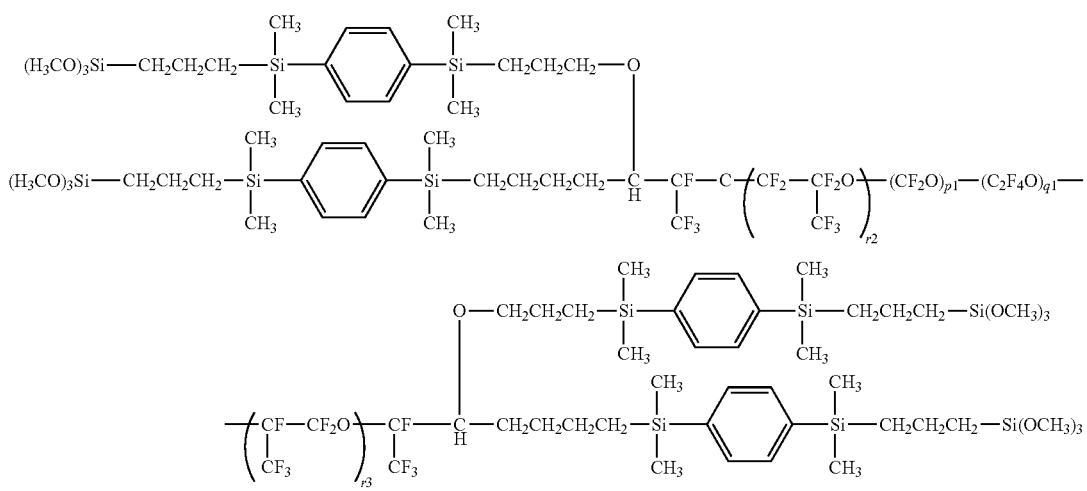

Herein p1 is an integer of 5 to 100, q1 is an integer of 5 to 100, r1 is an integer of 1 to 100, r2 is an integer of 1 to 99, r3 is an integer of 1 to 99, the sum of p1, q1, r1, r2 and r3 (e.g., p1+q1, p1+q1+r1, or p1+q1+r2+r3) is an integer of 10 to 110. Individual repeating units within the parentheses with p1, q1, r1, r2, and r3 may be randomly bonded.

The fluoropolyether-containing polymer having formula (2) wherein α=1 (i.e., Rf is a monovalent fluorooxyalkylene-containing polymer residue) or α=2 (i.e., Rf is a divalent fluorooxyalkylene-containing polymer residue) may be prepared, for example, by the following method.

First, a fluoropolyether-containing polymer having a carbonyl group at an end, represented by the general formula (6):

[Chem. 25]

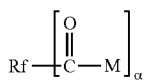
(6)

wherein Rf and a are as defined above, and M is an eliminatable monovalent group is reacted with an organic metal reagent having an aliphatic unsaturated double bond (olefin site) at an end and β-hydrogen (i.e., hydrogen atom bonded to the carbon atom at β-position relative to metal atom), preferably in the presence of a solvent.

In formula (6), M is an eliminatable monovalent group, for example, hydrogen, halogen, hydroxy, alkoxy, amino, alkylamino, thiol, alkylthio or acyl group.

Exemplary of M are the groups shown below.

[Chem. 26]

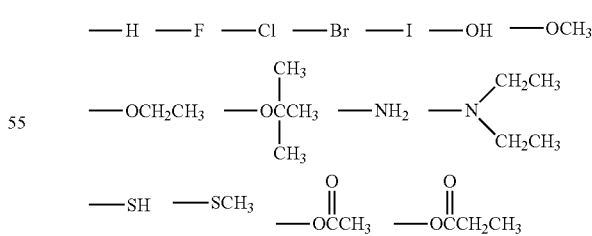

Examples of the fluoropolyether-containing polymer having a carbonyl group at an end, represented by formula (6) are shown below. Notably, in each formula, the number of repetition (or degree of polymerization) of repeating units that constitute the fluorooxyalkyl group or fluorooxyalkylene group (mono- or divalent fluorooxyalkylene-containing polymer residue) is shown below, although it may be an arbitrary number that satisfies the above formulae (3) and (4).

[Chem. 27]

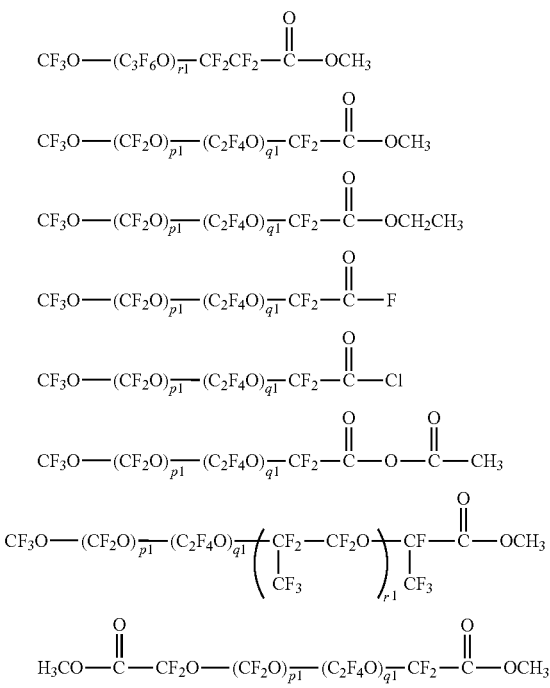

Herein p1, q1 and r1 are as defined above, and the sum of p1, q1 and r1 is an integer of 10 to 110. Individual repeating units within the parentheses with p1, q1, and r1 may be randomly bonded.

Illustrative of the organic metal reagent having an aliphatic unsaturated double bond at an end and β-hydrogen are organolithium reagents, Grignard reagents, organozinc reagents, organoboron reagents, and organotin reagents. Inter alia, Grignard reagents and organozinc reagents are preferred for ease of handling. The following compounds are preferably used as the organic metal reagent.

[Chem. 28]

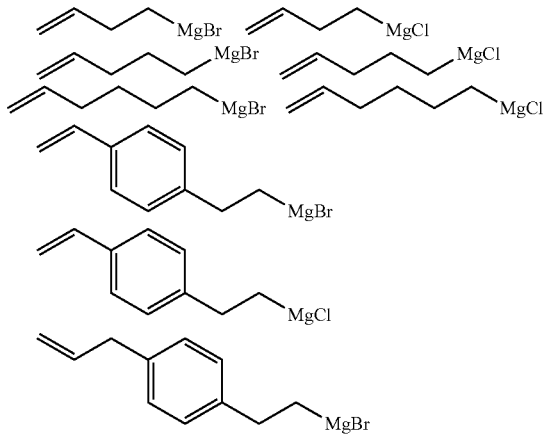

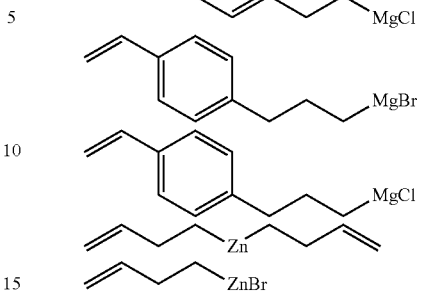

The amount of the organic metal reagent having an aliphatic unsaturated double bond at an end and β-hydrogen is preferably 2 to 5 equivalents, more preferably 2.5 to 3.5 equivalents, most preferably about 3 equivalents per equivalent of reactive end group (eliminatable monovalent group) in the fluoropolyether-containing polymer having a carbonyl group at an end, represented by formula (6).

A solvent may be used in the reaction of the fluoropolyether-containing polymer having a carbonyl group at an end, represented by formula (6) with the organic metal reagent having an aliphatic unsaturated double bond at an end and β-hydrogen. Although the solvent used herein is not particularly limited, a fluorochemical solvent is preferably used because the reactant is a fluorine compound. Suitable fluorochemical solvents include 1,3-bistrifluoromethylbenzene, trifluoromethylbenzene, perfluoro solvents (Asahiklin AC-2000, Asahiklin AC-6000) marketed from AGC Inc., hydrofluoroether (HFE) solvents (NOVEC 7100: $C_4F_9OCH_3$, NOVEC 7200: $C_4F_9OC_2H_5$, NOVEC 7300: $C_2F_5$—$CF(OCH_3)$—$CF(CF_3)_2$) marketed from 3M, and perfluoro solvents (PF5080, PF5070, PF5060) marketed from 3M. The fluorochemical solvents may be used alone or in admixture.

Besides the fluorochemical solvent, an organic solvent may also be used as the solvent. Ether solvents such as tetrahydrofuran (THF), monoethylene glycol dimethyl ether, diethylene glycol dimethyl ether, triethylene glycol dimethyl ether, tetraethylene glycol dimethyl ether, and dioxane may be used as the organic solvent. The organic solvent may be used alone or in admixture with the fluorochemical solvent.

The amount of the solvent used is 10 to 600 parts by weight, preferably 50 to 400 parts by weight, more preferably about 200 to 350 parts by weight per 100 parts by weight of the fluoropolyether-containing polymer having a carbonyl group at an end, represented by formula (6).

Conditions for the reaction of the fluoropolyether-containing polymer having a carbonyl group at an end, represented by formula (6) with the organic metal reagent having an aliphatic unsaturated double bond at an end and β-hydrogen include 0 to 80° C., preferably 45 to 70° C., more preferably about 50° C. and 1 to 12 hours, preferably 5 to 7 hours.

After the reaction is performed under the above conditions, the reaction is stopped, and the solution is separated into a water layer and a fluorochemical solvent layer by separatory operation. The fluorochemical solvent layer is washed with an organic solvent, after which the solvent is distilled off, obtaining a fluoropolyether-containing polymer having a hydroxy group and an olefin site at an end of the molecular chain, represented by the following formula (7).

[Chem. 29]

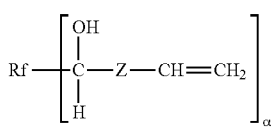

(7)

Herein Rf and α are as defined above, and Z is independently a divalent hydrocarbon group which may contain a silicon atom and/or siloxane bond.

[Chem. 31]

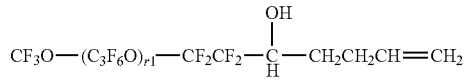

[Chem. 32]

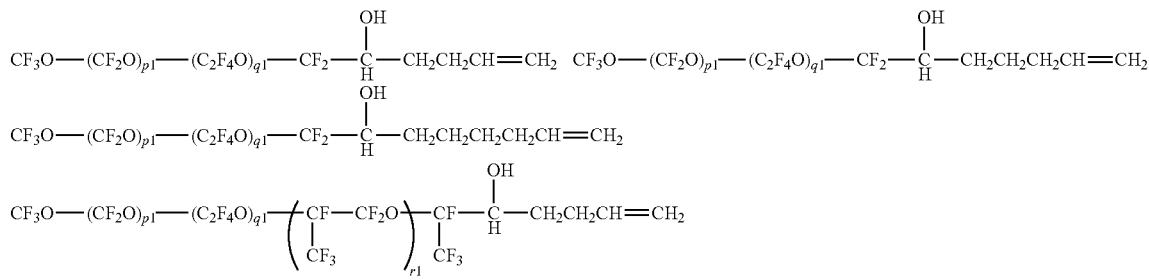

[Chem. 33]

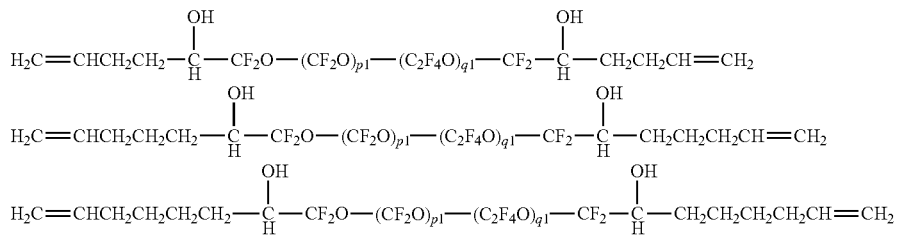

In formula (7), Z is independently a divalent hydrocarbon group, preferably of 1 to 20 carbon atoms, more preferably 2 to 12 carbon atoms. Examples thereof include $C_1$-$C_8$ alkylene groups such as methylene, ethylene, propylene (trimethylene, methylethylene), butylene (tetramethylene, methylpropylene), hexamethylene, and octamethylene, and alkylene groups containing a $C_6$-$C_8$ arylene group such as phenylene (e.g., $C_7$-$C_8$ alkylene-arylene groups). Z is preferably a $C_1$-$C_4$ straight alkylene group.

Examples of Z include the groups shown below.

[Chem. 30]

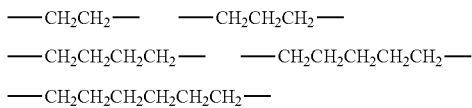

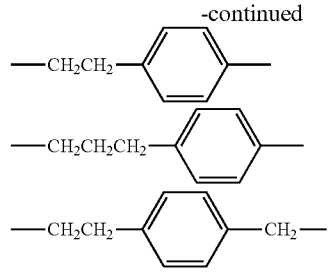

Examples of the fluoropolyether-containing polymer having a hydroxy group and an olefin site at an end of the molecular chain, represented by formula (7), are shown below. Notably, in each formula, the number of repetition (or degree of polymerization) of repeating units that constitute the fluorooxyalkyl group or fluorooxyalkylene group (mono- or divalent fluorooxyalkylene-containing polymer residue) is shown below, although it may be an arbitrary number that satisfies the above formulae (3) and (4).

Herein p1, q1 and r1 are as defined above, and the sum of p1, q1 and r1 is an integer of 10 to 110. Individual repeating units within the parentheses with p1, q1, and r1 may be randomly bonded.

Next, the fluoropolyether-containing polymer having a hydroxy group and an olefin site at an end of the molecular chain, represented by formula (7), and an olefin-introducing agent are aged in the presence of a base at a temperature of 0 to 90° C., preferably 40 to 60° C., more preferably about 50° C. for 1 to 48 hours, preferably 10 to 40 hours, more preferably about 24 hours, optionally along with an additive for enhancing reactivity and a solvent.

As the olefin-introducing agent to be reacted with the fluoropolyether-containing polymer having a hydroxy group and an olefin site at an end of the molecular chain, represented by formula (7), for example, halides may be used. Suitable halides include allyl bromide, allyl chloride, and 3-butenyl bromide.

The amount of the olefin-introducing agent used is preferably 1 to 15 equivalents, more preferably 3 to 6 equivalents, most preferably about 4 equivalents per equivalent of the reactive end group (hydroxy group) in the fluoropolyether-containing polymer having a hydroxy group and an olefin site at an end of the molecular chain, represented by formula (7).

Examples of the base used in the reaction of the fluoropolyether-containing polymer having a hydroxy group and an olefin site at an end of the molecular chain, represented by formula (7), with the olefin-introducing agent include amines and alkali metal bases. Exemplary amines include triethylamine, diisopropylethylamine, pyridine, DBU, and imidazole. Exemplary alkali metal bases include sodium hydroxide, potassium hydroxide, sodium hydride, potassium hydride, alkyllithium, t-butoxypotassium, lithium diisopropylamide, lithium bis(trimethylsilyl)amide, sodium bis(trimethylsilyl)amide, and potassium bis(trimethylsilyl)amide.

The amount of the base used is 1 to 20 equivalents, more preferably 4 to 8 equivalents, most preferably about 6 equivalents per equivalent of the reactive end group (hydroxy group) in the fluoropolyether-containing polymer having a hydroxy group and an olefin site at an end of the molecular chain, represented by formula (7).

For the reaction of the fluoropolyether-containing polymer having a hydroxy group and an olefin site at an end of the molecular chain, represented by formula (7), with the olefin-introducing agent, an additive for enhancing reactivity such as tetrabutylammonium halide or alkali metal halide may be used. Exemplary additives include tetrabutylammonium chloride, tetrabutylammonium bromide, tetrabutylammonium iodide, tetrabutylammonium hydrogen sulfate, sodium iodide, potassium iodide, cesium iodide, and crown ethers. In the reaction system, catalytic halogen exchange takes place between the additive and the olefin-introducing agent to enhance reactivity whereas a crown ether coordinates with the metal to enhance reactivity.

The amount of the additive used is 0.005 to 0.1 equivalent, more preferably 0.01 to 0.05 equivalent, most preferably about 0.02 equivalent per equivalent of the reactive end group (hydroxy group) in the fluoropolyether-containing polymer having a hydroxy group and an olefin site at an end of the molecular chain, represented by formula (7).

A solvent may be used in the reaction of the fluoropolyether-containing polymer having a hydroxy group and an olefin site at an end of the molecular chain, represented by formula (7), with the olefin-introducing agent. Although the solvent is not essential, a fluorochemical solvent is typically used as the solvent. Suitable fluorochemical solvents include fluorinated aromatic hydrocarbon solvents such as 1,3-bis(trifluoromethyl)benzene and trifluoromethylbenzene, hydrofluoroether (HFE) solvents (tradename Novec series by 3M) such as 1,1,1,2,3,4,4,5,5,5-decafluoro-3-methoxy-2-(trifluoromethyl)pentane, and perfluoro solvents composed of completely fluorinated compounds (tradename Fluorinert series by 3M). Organic solvents may also be used, for example, dimethylformamide, dimethylacetamide, dimethyl sulfoxide, acetonitrile, and THF.

The amount of the solvent used is 10 to 300 parts by weight, preferably 30 to 150 parts by weight, more preferably about 50 parts by weight per 100 parts by weight of the fluoropolyether-containing polymer having a hydroxy group and an olefin site at an end of the molecular chain, represented by formula (7).

The reaction of the fluoropolyether-containing polymer having a hydroxy group and an olefin site at an end of the molecular chain, represented by formula (7) with the olefin-introducing agent yields a fluoropolyether-containing polymer having two olefin sites at an end of the molecular chain, represented by the following formula (8).

[Chem. 34]

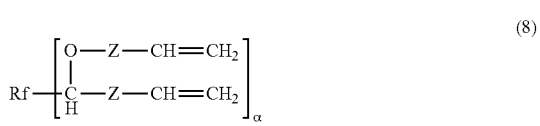

(8)

Herein Rf, Z and α are as defined above.

Preferred examples of the fluoropolyether-containing polymer having two olefin sites at an end of the molecular chain, represented by formula (8) are shown below. Notably, in each formula, the number of repetition (or degree of polymerization) of repeating units that constitute the fluorooxyalkyl group or fluorooxyalkylene group (mono- or divalent fluorooxyalkylene-containing polymer residue) is shown below, although it may be an arbitrary number that satisfies the above formulae (3) and (4).

[Chem. 35]

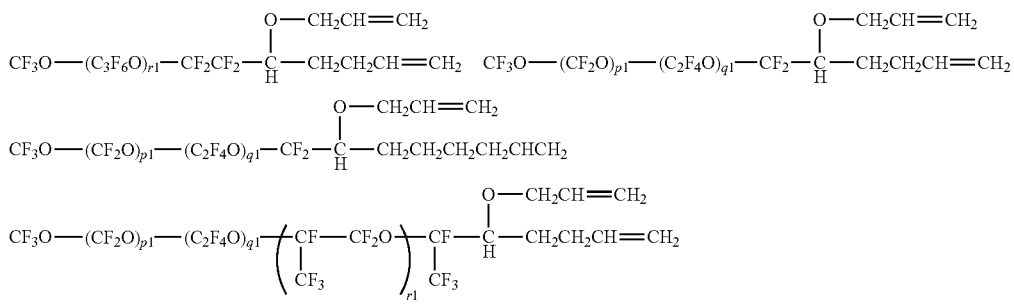

[Chem. 36]

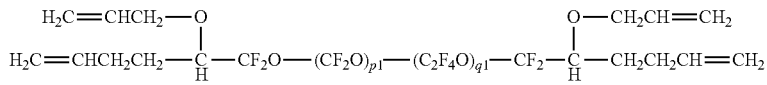

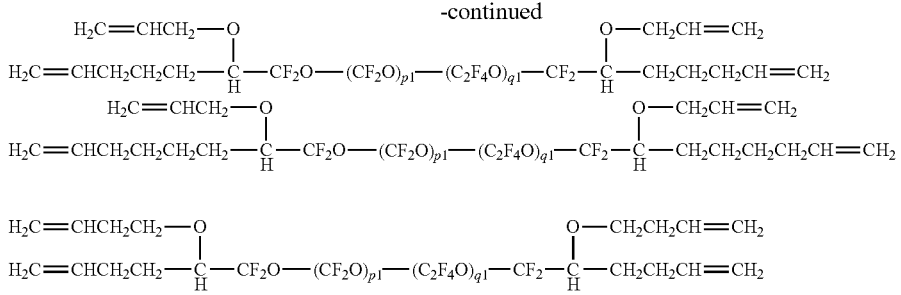

Herein p1, q1 and r1 are as defined above, and the sum of p1, q1 and r1 is an integer of 10 to 110. Individual repeating units within the parentheses with p1, q1, and r1 may be randomly bonded.

Next, the fluoropolyether-containing polymer having two olefin sites at an end of the molecular chain, represented by formula (8) is dissolved in a solvent such as fluorochemical solvent, typically 1,3-bis(trifluoromethyl)benzene. An organosilicon compound having a SiH group and a hydrolyzable end group in the molecule such as trimethoxysilane is mixed therewith. The mixture is aged in the presence of a hydrosilylation catalyst, for example, chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. There is obtained a fluoropolyether-containing polymer having formula (2).

An alternative method for preparing the fluoropolyether-containing polymer having formula (2) is, for example, the method shown below.

The fluoropolyether-containing polymer having two olefin sites at an end of the molecular chain, represented by formula (8) is dissolved in a solvent such as fluorochemical solvent, typically 1,3-bis(trifluoromethyl)benzene. An organosilicon compound having a SiH group and a hydrolyzable end group (halogen) in the molecule such as trichlorosilane is mixed therewith. The mixture is aged in the presence of a hydrosilylation catalyst, for example, chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours. It is noted that after aging, the substituent (halogen) on the silyl group may be converted to, for example, a methoxy group.

It is noted that an organosilicon compound having a SiH group and free of a hydrolyzable end group in the molecule may be used instead of the organosilicon compound having a SiH group and a hydrolyzable end group in the molecule. In this embodiment, an organosilicon compound having at least two SiH groups and free of a hydrolyzable end group in the molecule is used. After the fluoropolyether-containing polymer having two olefin sites at an end of the molecular chain, represented by formula (8) is reacted with the organosilicon compound having at least two SiH groups and free of a hydrolyzable end group in the molecule as in the above embodiment, the reaction product having SiH groups at a polymer end is mixed with an organosilicon compound having an olefin site and a hydrolyzable end group in the molecule, such as allyltrimethoxysilane. The mixture is aged in the presence of a hydrosilylation catalyst, for example, chloroplatinic acid/vinyl siloxane complex in toluene, at a temperature of 40 to 120° C., preferably 60 to 100° C., more preferably about 80° C. for a time of 1 to 72 hours, preferably 20 to 36 hours, more preferably about 24 hours.

As the organosilicon compound having a SiH group and a hydrolyzable end group in the molecule used in the preparation of the fluoropolyether-containing polymer having formula (2), compounds having the general formulae (9a) to (9d) are preferred.

[Chem. 37]

(9a)

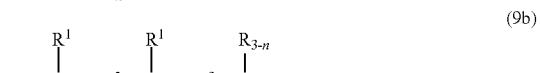
(9b)

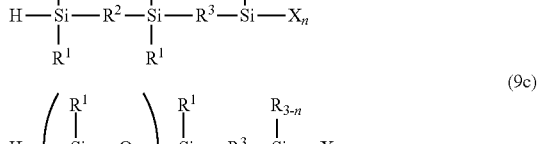
(9c)

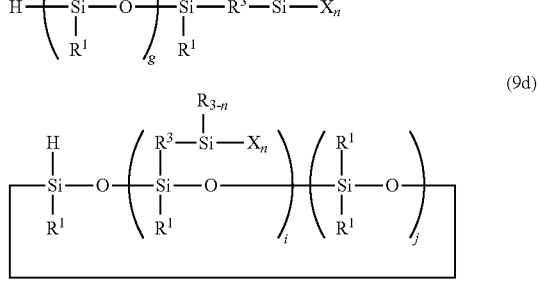
(9d)

Herein R, X, n, $R^1$, $R^2$, g and j are as defined above, i is an integer of 1 to 5, preferably 1 to 3, i+j is an integer of 2 to 9, preferably 2 to 4, and $R^3$ is a $C_2$-$C_8$ divalent hydrocarbon group.

$R^3$ is a $C_2$-$C_8$, preferably $C_2$-$C_4$ divalent hydrocarbon group, examples of which include alkylene groups such as methylene, ethylene, propylene (trimethylene, methylethylene), butylene (tetramethylene, methylpropylene), hexamethylene, and octamethylene, arylene groups such as phenylene, or combinations of at least two of the foregoing (e.g., alkylene-arylene groups). Inter alia, ethylene and trimethylene are preferred.

Examples of the organosilicon compound having a SiH group and a hydrolyzable end group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as the silane compounds shown below.

[Chem. 38]

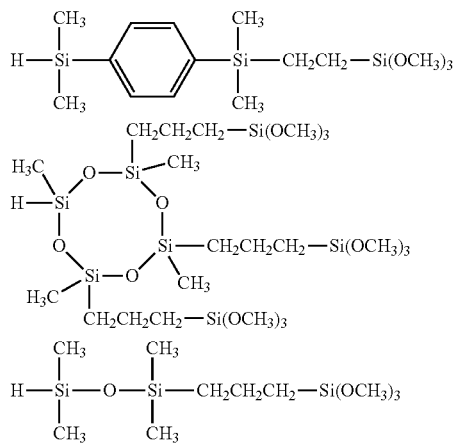

In the embodiment wherein the preparation of the fluoropolyether-containing polymer having formula (2) involves the addition reaction of the fluoropolyether-containing polymer having two olefin sites at an end of the molecular chain to the organosilicon compound having a SiH group and a hydrolyzable end group in the molecule, the organosilicon compound having a SiH group and a hydrolyzable end group in the molecule is preferably used in such an amount as to provide 1.5 to 4 equivalents, more preferably 2 to 2.5 equivalents of SiH group in the organosilicon compound per equivalent of reactive end group (terminal olefin site) in the fluoropolyether-containing polymer having two olefin sites at an end of the molecular chain.

As the organosilicon compound having at least two SiH groups and free of a hydrolyzable end group in the molecule used in the preparation of the fluoropolyether-containing polymer having formula (2), compounds having the general formulae (10a) to (10c) are preferred.

[Chem. 39]

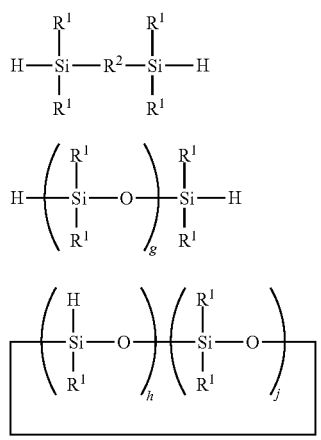

Herein $R^1$, $R^2$, g, h, j, and h+j are as defined above.

Examples of the organosilicon compound having at least two SiH groups and free of a hydrolyzable end group in the molecule include compounds as shown below.

[Chem. 40]

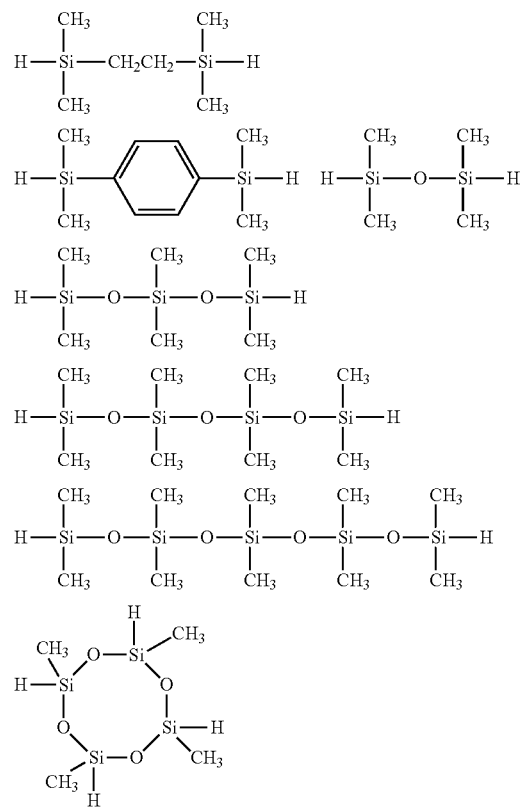

In the alternative embodiment wherein the preparation of the fluoropolyether-containing polymer having formula (2) involves the addition reaction of the fluoropolyether-containing polymer having two olefin sites at an end of the molecular chain to the organosilicon compound having at least two SiH groups and free of a hydrolyzable end group in the molecule, the organosilicon compound having at least two SiH groups and free of a hydrolyzable end group in the molecule is preferably used in such an amount as to provide 5 to 30 equivalents, more preferably 7 to 20 equivalents, most preferably about 10 equivalents of SiH group in the organosilicon compound per equivalent of reactive end group (terminal olefin site) in the fluoropolyether-containing polymer having two olefin sites at an end of the molecular chain.

In the preparation of the fluoropolyether-containing polymer having formula (2), examples of the addition reaction product of the fluoropolyether-containing polymer having two olefin sites at an end of the molecular chain with the organosilicon compound having at least two SiH groups and free of a hydrolyzable end group in the molecule include those of the following formulae. In each formula, the number of repetition (or degree of polymerization) of repeating units that constitute the fluorooxyalkyl group or fluorooxyalkylene group (mono- or divalent fluorooxyalkylene-containing polymer residue) is shown below, although it may be an arbitrary number that satisfies the above formulae (3) and (4).

[Chem. 41]

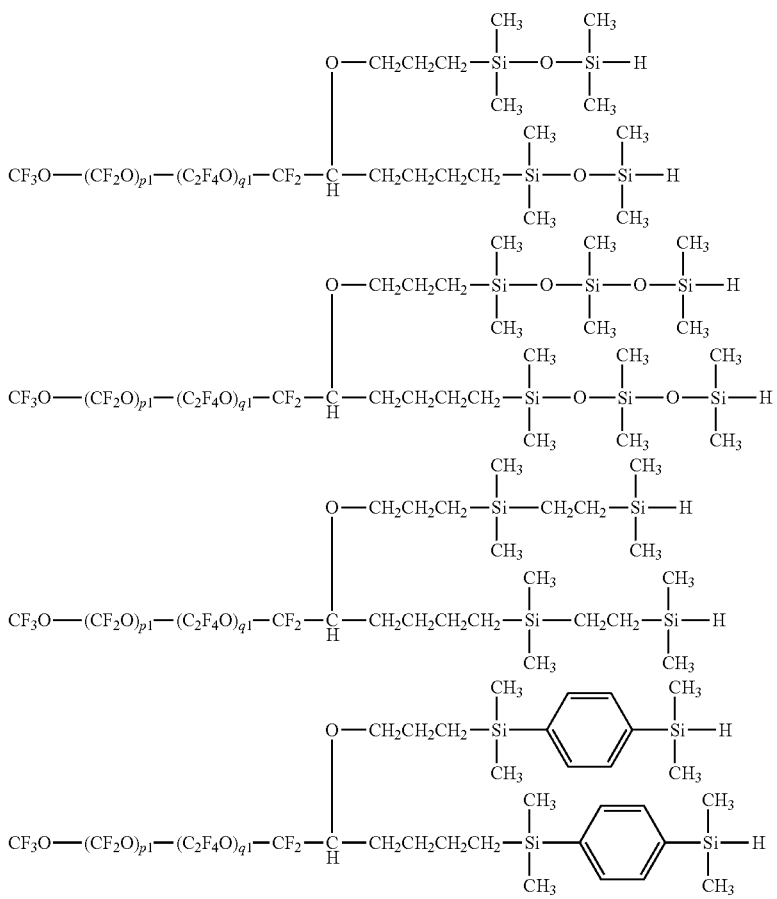

Herein p1 and q1 are as defined above, the sum of p1 and q1 is an integer of 10 to 110. Individual repeating units within the parentheses with p1 and q1 may be randomly bonded.

In the preparation of the fluoropolyether-containing polymer having formula (2), compounds having the general formula (11) are preferred as the organosilicon compound having an olefin site and a hydrolyzable end group in the molecule to be reacted with SiH groups at a polymer end of the addition reaction product.

[Chem. 42]

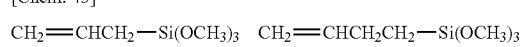
(11)

Herein R, X and n are as defined above, and U is a single bond or a $C_1$-$C_6$ divalent hydrocarbon group.

In formula (11), U is a single bond or a $C_1$-$C_6$ divalent hydrocarbon group. Examples of the $C_1$-$C_6$ divalent hydrocarbon group include alkylene groups such as methylene, ethylene, propylene (trimethylene, methylethylene), butylene (tetramethylene, methylpropylene), and hexamethylene, and phenylene. U is preferably a single bond or methylene.

Examples of the organosilicon compound having an olefin site and a hydrolyzable end group in the molecule include compounds as shown below.

[Chem. 43]

In the embodiment wherein the preparation of the fluoropolyether-containing polymer having formula (2) involves the reaction of the addition reaction product between the fluoropolyether-containing polymer having two olefin sites at an end of the molecular chain and the organosilicon compound having at least two SiH groups and free of a hydrolyzable end group in the molecule with the organosilicon compound having an olefin site and a hydrolyzable end group in the molecule, the organosilicon compound having an olefin site and a hydrolyzable end group in the molecule is preferably used in such an amount as to provide 1.5 to 4 equivalents, more preferably 2 to 2.5 equivalents of olefin site in the organosilicon compound having an olefin site and a hydrolyzable end group in the molecule per equivalent of reactive end group (terminal SiH group) in the addition reaction product between the fluoropolyether-containing polymer having two olefin sites at an end of the molecular chain and the organosilicon compound having at least two SiH groups and free of a hydrolyzable end group in the molecule.

As the solvent used in the preparation of the fluoropolyether-containing polymer having formula (2), fluorochemical solvents are preferred. Suitable fluorochemical solvents include 1,3-bis(trifluoromethyl)benzene, trifluoromethylbenzene, methyl nonafluorobutyl ether, methyl nonafluoroisobutyl ether, ethyl nonafluorobutyl ether, ethyl nonafluoroisobutyl ether, hydrofluoroether (HFE) solvents (tradename Novec series by 3M) such as 1,1,1,2,3,4,4,5,5,5-decafluoro-3-methoxy-2-(trifluoromethyl)pentane, and perfluoro solvents composed of completely fluorinated compounds (tradename Fluorinert series by 3M).

The amount of the solvent used is 10 to 300 parts by weight, preferably 50 to 150 parts by weight, more preferably about 100 parts by weight per 100 parts by weight of the fluoropolyether-containing polymer having two olefin sites at a molecular chain end.

Examples of the hydrosilylation catalyst used used in the preparation of the fluoropolyether-containing polymer having formula (2) include platinum group metal based catalysts such as platinum black, chloroplatinic acid, alcohol-modi-

[Chem. 46]

$$H_2C=CHCH_2CH_2-\underset{H}{\overset{H_2C=CHCH_2-O}{\underset{|}{C}}}-CF_2O-(CF_2O)_{p1}-(C_2F_4O)_{q1}-CF_2-\underset{H}{\overset{O-CH_2CH=CH_2}{\underset{|}{C}}}-CH_2CH_2CH=CH_2,$$

p1:q1 = 47:53, p1 + q1 ≅ 43 fied chloroplatinic acid, complexes of chloroplatinic acid with olefin, aldehyde, vinyl siloxane, and acetylene alcohol, tetrakis(triphenylphosphine)palladium, and chlorotris(triphenylphosphine)rhodium. Inter alia, platinum compounds such as vinyl siloxane coordination compounds are preferred.

The hydrosilylation catalyst is preferably used in an amount to provide 0.01 to 100 ppm, more preferably 0.1 to 50 ppm of transition metal based on the weight of the fluoropolyether-containing polymer having two olefin sites at a molecular chain end or the reaction product of this polymer with the organosilicon compound having at least two SiH groups and free of a hydrolyzable end group in the molecule.

Thereafter, the solvent and unreacted reactants are distilled off in vacuum, yielding the target compound.

In one example, when the fluoropolyether-containing polymer having two olefin sites at a molecular chain end is a compound having the following formula:

[Chem. 44]

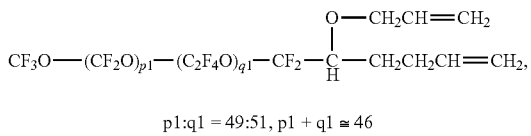

p1:q1 = 49:51, p1 + q1 ≅ 46 and the organosilicon compound having a SiH group and a hydrolyzable end group in the molecule is trimethoxysilane, a compound of the following formula is obtained.

[Chem. 45]

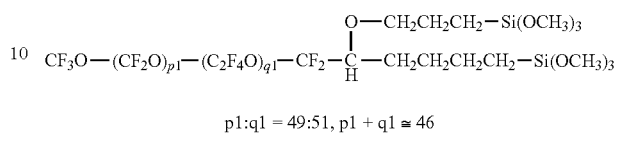

p1:q1 = 49:51, p1 + q1 ≅ 46

In another example, when the fluoropolyether-containing polymer having two olefin sites at a molecular chain end is a compound having the following formula:

and the organosilicon compound having a SiH group and a hydrolyzable end group in the molecule is trimethoxysilane, a compound of the following formula is obtained.

[Chem. 47]

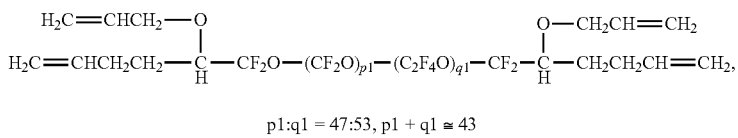

p1:q1 = 47:53, p1 + q1 ≅ 43

Another embodiment of the invention is a surface treating agent comprising a fluoropolyether-containing polymer having a hydroxy-containing silyl group or a hydrolyzable silyl group, represented by the above formula (1), preferably a fluoropolyether-containing polymer having a hydroxy-containing silyl group or a hydrolyzable silyl group, represented by the above formula (2). The surface treating agent may also comprise a partial (hydrolytic) condensate which is obtained by condensing the hydroxy group on the fluoropolyether-containing polymer, or a hydroxy group resulting from partial hydrolysis of the hydrolyzable end group on the fluoropolyether-containing polymer in a well-known manner.

To the surface treating agent, a hydrolytic condensation catalyst may be added if necessary. Suitable hydrolytic condensation catalysts include organotin compounds such as dibutyltin dimethoxide and dibutyltin dilaurate, organotitanium compounds such as tetra-n-butyl titanate, organic acids such as acetic acid, methanesulfonic acid, and fluorine-modified carboxylic acids, and inorganic acids such as hydrochloric acid and sulfuric acid. Of these, acetic acid, tetra-n-butyl titanate, dibutyltin dilaurate, and fluorine-modified carboxylic acids are desirable.

The hydrolytic condensation catalyst may be added in a catalytic amount, typically 0.01 to 5 parts, more preferably 0.1 to 1 part by weight per 100 parts by weight of the fluoropolyether-containing polymer and/or its partial (hydrolytic) condensate.

The surface treating agent may further comprise a solvent. Suitable solvents include fluorine-modified aliphatic hydrocarbon solvents such as perfluoroheptane and perfluorooctane; fluorine-modified aromatic hydrocarbon solvents such as 1,3-bis(trifluoromethyl)benzene; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, toluene, and xylene; ketone solvents such as acetone, methyl ethyl ketone, and methyl isobutyl ketone. Of these, fluorine-modified solvents are desirable for solubility and wettability, with 1,3-bis(trifluoromethyl)benzene, perfluoro(2-butyltetrahydrofuran), perfluorotributylamine, and ethyl perfluorobutyl ether being more desirable.

The solvents may be used in admixture of two or more while it is preferred that the fluoropolyether-containing polymer and its partial (hydrolytic) condensate be uniformly dissolved in the solvent. An optimum concentration of the fluoropolyether-containing polymer and its partial (hydrolytic) condensate in the solvent varies with a particular treating mode. The amount which is easy to weigh may be chosen. In the case of direct coating, the concentration may preferably be 0.01 to 10 parts by weight, more preferably 0.05 to 5 parts by weight per 100 parts by weight of the solvent and the fluoropolyether-containing polymer (and its partial (hydrolytic) condensate) combined. In the case of evaporation treatment, the concentration may preferably be 1 to 100 parts by weight, more preferably 3 to 30 parts by weight per 100 parts by weight of the solvent and the fluoropolyether-containing polymer (and its partial (hydrolytic) condensate) combined.

The surface treating agent may be applied to a substrate by any well-known techniques such as brush coating, dipping, spraying and evaporation. In the case of evaporation, the heating mode may be either resistance heating or EB heating and is not particularly limited. The curing temperature varies with a particular curing technique. For example, in the case of direct coating (brush coating, dipping or spraying), suitable curing conditions include a temperature of 25 to 200° C., especially 25 to 80° C. for 30 minutes to 36 hours, especially 1 to 24 hours. When the agent is applied by evaporation, the curing temperature is desirably in a range of 20 to 200° C. Humid curing conditions are also useful. The cured coating typically has a thickness of 0.1 to 100 nm, desirably 1 to 20 nm although the thickness depends on the type of substrate. Also, in the case of spray coating, for example, a procedure involving diluting the agent with a fluorochemical solvent having water previously added thereto, for thereby effecting hydrolysis to generate Si—OH, and thereafter, spraying the dilution is recommended because the coating rapidly cures.

The substrate to be treated with the surface treating agent is not particularly limited, and may be made of any desired materials including paper, fabric, metals, metal oxides, glass, plastics, ceramics, and quartz. The surface treating agent is effective for endowing the substrate with water/oil repellency, steel wool abrasion resistance, and water sliding properties. In particular, the surface treating agent is advantageously used for the treatment of $SiO_2$-deposited glass and film.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, antireflective film, and other optical articles. The surface treating agent of the invention is effective for preventing fingerprints and sebum from adhering to the articles and also for imparting scratch resistance or abrasion resistance. Therefore, it is particularly useful as a water/oil repellent layer on touch panel displays and antireflective films.

The surface treating agent is also used for anti-staining coatings on sanitary ware such as bathtubs and washbowls; anti-staining coatings on glazing or strengthened glass and head lamp covers in transport vehicles such as automobiles, trains and aircraft; water/oil repellent coatings on building exteriors; coatings for preventing oil contamination on kitchen ware; anti-staining, anti-sticking, anti-graffiti coatings in telephone booths; anti-fingerprint coatings on artistic objects; anti-fingerprint coatings on compact discs and DVD's; mold parting agents; paint additives; and resin modifiers. The agent is also effective for modifying the flow and dispersion of inorganic fillers, and for improving the lubricity of tape and film.

EXAMPLES

Examples and Comparative Examples are given below for illustrating the invention, but the invention is not limited by Examples.

Example 1

A reactor was charged with 272 ml of a 0.5 M THF solution of 3-butenylmagnesium bromide ($1.4 \times 10^{-1}$ mol). With stirring, a mixture of 200 g ($4.5 \times 10^{-2}$ mol) of a compound having the formula (A):

[Chem. 48]

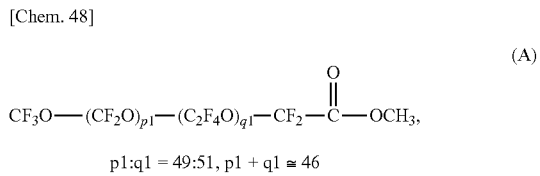

$p1:q1 = 49:51, p1 + q1 \cong 46$ 400 g of Asahiklin AC-6000, and 200 g of PF5060 was added dropwise to the reactor, which was heated at 50° C. for 6 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 193 g of a fluoropolyether-containing polymer (number average molecular weight about 4,430) having the following formula (B).

[Chem. 49]

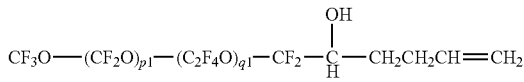

(B)

p1:q1 = 49:51, p1 + q1 ≅ 46

$^1$H-NMR
δ 1.4-1.7 (C—C$\underline{H}_2$CH$_2$CH=CH$_2$) 2H
δ 1.9-2.2 (C—C$\underline{H}_2$CH$_2$CH=CH$_2$, —CF$_2$—CH(OH)—CH$_2$—) 3H
δ 3.6-3.8 (—CF$_2$—C$\underline{H}$(OH)—CH$_2$—) 1H
δ 4.8-4.9 (—CH$_2$CH=C$\underline{H}_2$) 2H
δ 5.5-5.6 (—CH$_2$C$\underline{H}$=CH$_2$) 1H In a reactor, 100 g (2.3×10$^{-2}$ mol) of the compound having the formula (B):

[Chem. 50]

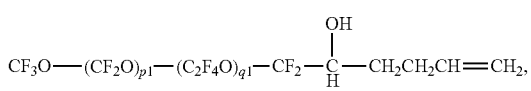

(B)

p1:q1 = 49:51, p1 + q1 ≅ 46

11 g (9.2×10$^{-2}$ mol) of allyl bromide, and 0.17 g (4.6×10$^{-4}$ mol) of tetrabutylammonium iodide were mixed. Subsequently, 18 g (1.4×10$^{-1}$ mol) of 30 wt % sodium hydroxide aqueous solution was added. The solution was heated at 50° C. for 24 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 97 g of a fluoropolyether-containing polymer having the following formula (C).

[Chem. 51]

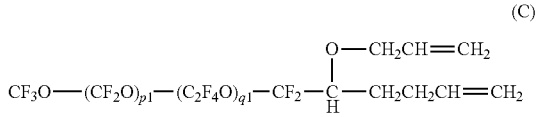

(C)

p1:q1 = 49:51, p1 + q1 ≅ 46

$^1$H-NMR
δ 1.5-1.7 (C—C$\underline{H}_2$CH$_2$CH=CH$_2$) 2H
δ 1.9-2.1 (C—CH$_2$C$\underline{H}_2$CH=CH$_2$) 2H
δ 3.4-3.5 (CF$_2$—CH(OC$\underline{H}_2$CH=CH$_2$)) 1H
δ 3.8-3.9 (CF$_2$—CH(OC$\underline{H}_2$CH=CH$_2$)) 1H
δ 4.1-4.2 (CF$_2$—C$\underline{H}$(OCH$_2$CH=CH$_2$)) 1H
δ 4.8-4.9 (CF$_2$—CH(OCH$_2$CH=C$\underline{H}_2$)) 2H
δ 5.0-5.2 (C—CH$_2$CH$_2$CH=C$\underline{H}_2$) 2H
δ 3.4-3.5 (CF$_2$—CH(OCH$_2$C$\underline{H}$=CH$_2$)) 1H
δ 5.7-5.8 (C—CH$_2$CH$_2$C$\underline{H}$=CH$_2$) 1H In a reactor, 80 g (1.8×10$^{-2}$ mol) of the compound having the formula (C):

[Chem. 52]

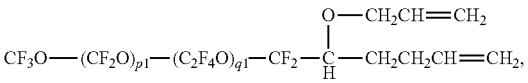

(C)

p1:q1 = 49:51, p1 + q1 ≅ 46

80 g of 1,3-bis(trifluoromethyl)benzene, 8.8 g (7.2×10$^{-2}$ mol) of trimethoxysilane, and 8.0×10$^{-2}$ g of a toluene solution of chloroplatinic acid/vinyl siloxane complex (containing 2.4×10$^{-7}$ mol of Pt) were mixed. The solution was aged at 80° C. for 24 hours. Thereafter, the solvent and unreacted reactants were distilled off in vacuum, obtaining 84 g of a liquid product.

On $^1$H-NMR analysis, the compound was identified to have a structure of the following formula (D).

[Chem. 53]

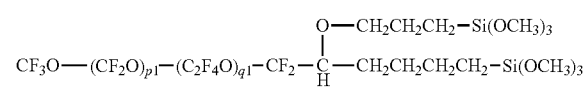

(D)

p1:q1 = 49:51, p1 + q1 ≅ 46

$^1$H-NMR
δ 0.4-0.6 (—O—CH$_2$CH$_2$C$\underline{H}_2$—Si, C—CH$_2$CH$_2$CH$_2$C$\underline{H}_2$—Si) 4H
δ 1.2-1.7 (—O—CH$_2$C$\underline{H}_2$CH$_2$—Si, C—CH$_2$C$\underline{H}_2$CH$_2$CH$_2$—Si) 8H
δ 3.4-3.5 (CF$_2$—C$\underline{H}$(—O—CH$_2$CH$_2$CH$_2$—Si)) 1H
δ 3.3-3.7 (—O—C$\underline{H}_2$CH$_2$CH$_2$—Si, —Si(OC$\underline{H}_2$)$_3$) 20H Example 2

A reactor was charged with 272 ml of a 0.5 M THF solution of 5-hexenylmagnesium bromide (1.36×10$^{-1}$ mol). With stirring, a mixture of 200 g (4.5×10$^{-2}$ mol) of a compound having the formula (A):

[Chem. 54]

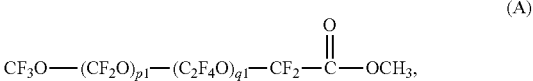

(A)

p1:q1 = 49:51, p1 + q1 ≅ 46

400 g of Asahiklin AC-6000, and 200 g of PF5060 was added dropwise to the reactor, which was heated at 50° C. for 6 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 189 g of a fluoropolyether-containing polymer (number average molecular weight about 4,450) having the following formula (E).

[Chem. 55]

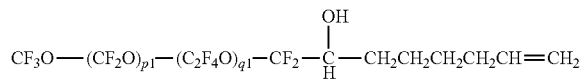

(E)

p1:q1 = 49:51, p1 + q1 ≅ 46

$^1$H-NMR
δ 1.3-1.8 (C—C$\underline{H_2}$C$\underline{H_2}$C$\underline{H_2}$CH$_2$CH=CH$_2$) 6H
δ 1.9-2.1 (C—CH$_2$CH$_2$CH$_2$C$\underline{H_2}$CH=CH$_2$) 2H
δ 3.3-3.5 (—CF$_2$—CH(O$\underline{H}$)—CH$_2$—) 1H
δ 3.6-3.8 (—CF$_2$—C$\underline{H}$(OH)—CH$_2$—) 1H
δ 4.7-4.9 (—CH$_2$CH=C$\underline{H_2}$) 2H
δ 5.5-5.7 (—CH$_2$C$\underline{H}$=CH$_2$) 1H In a reactor, 20 g (4.5×10$^{-3}$ mol) of the compound having the formula (E):

[Chem. 56]

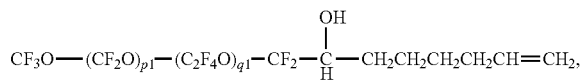

(E)

p1:q1 = 49:51, p1 + q1 ≅ 46

2.2 g (1.8×10$^{-2}$ mol) of allyl bromide, and 0.03 g (9.0×10$^{-5}$ mol) of tetrabutylammonium iodide were mixed. Subsequently, 3.6 g (2.7×10$^{-2}$ mol) of 30 wt % sodium hydroxide aqueous solution was added. The solution was heated at 50° C. for 24 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 21 g of a fluoropolyether-containing polymer having the following formula (F).

[Chem. 57]

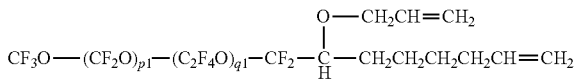

(F)

p1:q1 = 49:51, p1 + q1 ≅ 46

$^1$H-NMR
δ 1.3-1.8 (C—C$\underline{H_2}$C$\underline{H_2}$C$\underline{H_2}$CH$_2$CH=CH$_2$) 6H
δ 1.9-2.1 (C—CH$_2$CH$_2$CH$_2$C$\underline{H_2}$CH=CH$_2$) 2H
δ 3.4-3.5 (CF$_2$—CH(OCH$_2$C$\underline{H}$=CH$_2$)) 1H
δ 3.8-3.9 (CF$_2$—C$\underline{H}$(OCH$_2$CH=CH$_2$)) 1H
δ 4.1-4.2 (CF$_2$—CH(OC$\underline{H_2}$CH=CH$_2$)) 1H
δ 4.8-4.9 (CF$_2$—CH(OC$\underline{H_2}$CH=C$\underline{H_2}$)) 2H
δ 5.0-5.2 (C—CH$_2$CH$_2$CH=C$\underline{H_2}$) 2H
δ 3.4-3.5 (CF$_2$—CH(OCH$_2$C$\underline{H}$=CH$_2$)) 1H
δ 5.7-5.8 (C—CH$_2$CH$_2$C$\underline{H}$=CH$_2$) 1H In a reactor, 10 g (2.2×10$^{-3}$ mol) of the compound having the formula (F):

[Chem. 58]

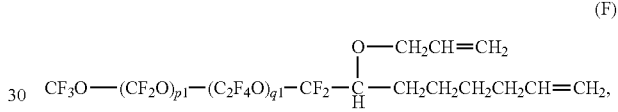

(F)

p1:q1 = 49:51, p1 + q1 ≅ 46

10 g of 1,3-bis(trifluoromethyl)benzene, 1.1 g (8.8×10$^{-3}$ mol) of trimethoxysilane, and 1.0×10$^{-2}$ g of a toluene solution of chloroplatinic acid/vinyl siloxane complex (containing 3.0×10$^{-8}$ mol of Pt) were mixed. The solution was aged at 80° C. for 24 hours. Thereafter, the solvent and unreacted reactants were distilled off in vacuum, obtaining 9.7 g of a liquid product.

On $^1$H-NMR analysis, the compound was identified to have a structure of the following formula (G).

[Chem. 59]

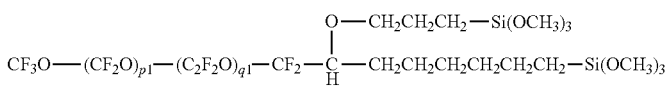

(G)

p1:q1 = 49:51, p1 + q1 ≅ 46

$^1$H-NMR
δ 0.4-0.6 (—O—CH$_2$CH$_2$C$\underline{H_2}$—Si, C—CH$_2$CH$_2$CH$_2$C$\underline{H_2}$—Si) 4H
δ 1.1-1.8 (—O—CH$_2$C$\underline{H_2}$CH$_2$—Si, C—C$\underline{H_2}$C$\underline{H_2}$C$\underline{H_2}$C$\underline{H_2}$CH$_2$CH$_2$—Si) 12H
δ 3.6-3.7 (CF$_2$—C$\underline{H}$(—O—CH$_2$CH$_2$CH$_2$—Si)) 1H
δ 3.3-3.7 (—O—C$\underline{H_2}$CH$_2$CH$_2$—Si, —Si(OC$\underline{H_3}$)$_3$) 20H Example 3

A reactor was charged with 126 ml of a 0.5 M THF solution of 3-butenylmagnesium bromide (6.3×10$^{-2}$ mol). With stirring, a mixture of 100 g (2.1×10$^{-2}$ mol) of a compound having the formula (H):

[Chem. 60]

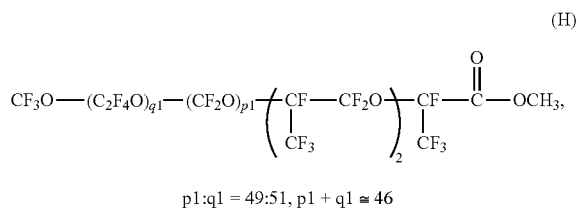

p1:q1 = 49:51, p1 + q1 ≅ 46

200 g of Asahiklin AC-6000, and 100 g of PF5060 was added dropwise to the reactor, which was heated at 50° C. for 6 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 96 g of a fluoropolyether-containing polymer (number average molecular weight about 4,800) having the following formula (I).

[Chem. 61]

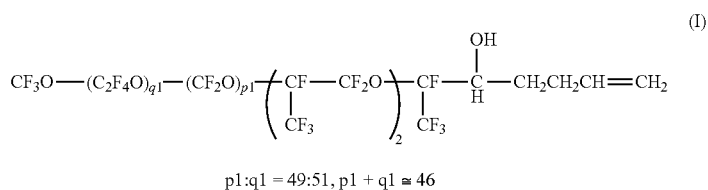

p1:q1 = 49:51, p1 + q1 ≅ 46

$^1$H-NMR
δ 1.4-1.7 (C—C$\underline{H_2}$CH$_2$CH=CH$_2$) 2H
δ 1.9-2.2 (C—C$\underline{H_2}$CH$_2$CH=CH$_2$, —CF(CF$_3$)—CH (O$\underline{H}$)—CH$_2$—) 3H
δ 3.5-3.7 (—CF(CF$_3$)—C$\underline{H}$(OH)—CH$_2$—) 1H
δ 4.8-4.9 (—CH$_2$CH=C$\underline{H_2}$) 2H
δ 5.5-5.6 (—CH$_2$C$\underline{H}$=CH$_2$) 1H In a reactor, 20 g (4.2×10$^{-3}$ mol) of the compound having the formula (I):

[Chem. 62]

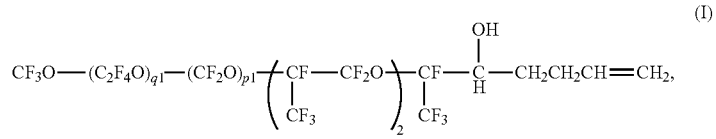

p1:q1 = 49:51, p1 + q1 ≅ 46

2.1 g (1.7×10$^{-2}$ mol) of allyl bromide, and 0.03 g (8.4×10$^{-5}$ mol) of tetrabutylammonium iodide were mixed. Subsequently, 3.4 g (2.5×10$^{-2}$ mol) of 30 wt % sodium hydroxide aqueous solution was added. The solution was heated at 50° C. for 24 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 19 g of a fluoropolyether-containing polymer having the following formula (J).

[Chem. 63]

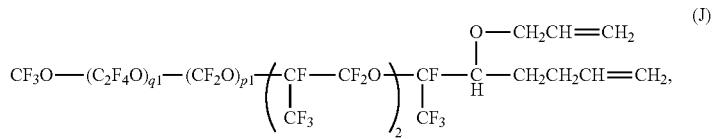

p1:q1 = 49:51, p1 + q1 ≅ 46

¹H-NMR
δ 1.5-1.7 (C—C<u>H</u>₂CH₂CH=CH₂) 2H
δ 2.1-2.3 (C—C<u>H</u>₂CH₂CH=CH₂) 2H
δ 3.6-3.7 (CF₂—C<u>H</u>(OCH₂CH=CH₂)) 1H
δ 3.9-4.0 (CF₂—CH(OC<u>H</u>₂CH=CH₂)) 1H
δ 4.2-4.3 (CF₂—CH(OC<u>H</u>₂CH=CH₂)) 1H
δ 4.8-4.9 (CF₂—CH(OCH₂CH=C<u>H</u>₂)) 2H
δ 5.0-5.2 (C—CH₂CH₂CH=C<u>H</u>₂) 2H
δ 3.4-3.5 (CF₂—CH(OCH₂C<u>H</u>=CH₂)) 1H
δ 5.7-5.8 (C—CH₂CH₂C<u>H</u>=CH₂) 1H

In a reactor, 10 g (2.1×10⁻³ mol) of the compound having the formula (J):

[Chem. 64]

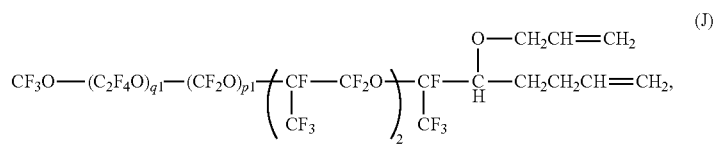

p1:q1 = 49:51, p1 + q1 ≅ 46

10 g of 1,3-bis(trifluoromethyl)benzene, 1.0 g (8.2×10⁻³ mol) of trimethoxysilane, and 1.0×10⁻² g of a toluene solution of chloroplatinic acid/vinyl siloxane complex (containing 3.0×10⁻⁸ mol of Pt) were mixed. The solution was aged at 80° C. for 24 hours. Thereafter, the solvent and unreacted reactants were distilled off in vacuum, obtaining 9.7 g of a liquid product.

On ¹H-NMR analysis, the compound was identified to have a structure of the following formula (K).

[Chem. 65]

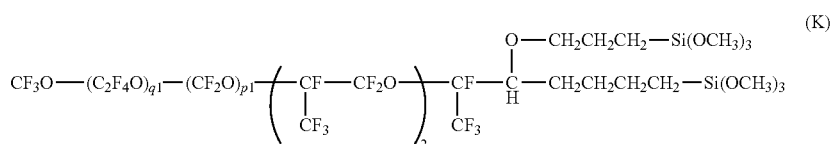

p1:q1 = 49:51, p1 + q1 ≅ 46

¹H-NMR
δ 0.4-0.6 (—O—CH₂CH₂C<u>H</u>₂—Si, —CH₂CH₂CH₂C<u>H</u>₂—Si) 4H
δ 1.2-1.7 (—O—CH₂C<u>H</u>₂CH₂—Si, C—C<u>H</u>₂C<u>H</u>₂C<u>H</u>₂C<u>H</u>₂—Si) 8H
δ 3.6-3.7 (CF₂—C<u>H</u>(—O—CH₂CH₂CH₂—Si)) 1H
δ 3.3-3.7 (—O—C<u>H</u>₂CH₂CH₂—Si, —Si(OC<u>H</u>₃)₃) 20H

Example 4

In a reactor, 20 g (4.5×10⁻³ mol) of the compound having formula (C):

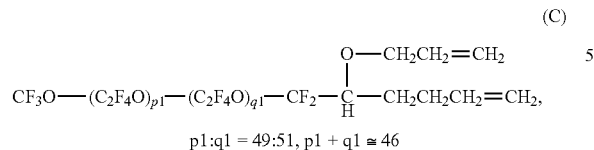

(C)

p1:q1 = 49:51, p1 + q1 ≅ 46

6.0 g (4.5×10⁻² mol) of a siloxane having the formula (L):

(L)

and 20 g of 1,3-bis(trifluoromethyl)benzene were mixed and heated at 80° C. Then $2.0 \times 10^{-2}$ g of a toluene solution of chloroplatinic acid/vinyl siloxane complex (containing $6.0 \times 10^{-8}$ mol of Pt) was added to the mixture, which was aged at 80° C. for 24 hours. Thereafter, the residual solvent was distilled off in vacuum, obtaining 21 g of a fluoropolyether-containing polymer having the following formula (M).

[Chem. 68]

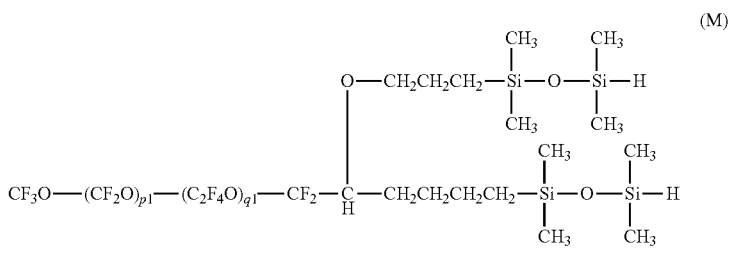

(M)

p1:q1 = 49:51, p1 + q1 ≅ 46

$^1$H-NMR
δ 0-0.3 (—Si—(C$\underline{H_3}$)$_2$-) 24H
δ 0.4-0.6 (—O—CH$_2$CH$_2$C$\underline{H_2}$—Si, C—C$\underline{H_2}$CH$_2$CH$_2$C$\underline{H_2}$—Si) 4H
δ 1.2-1.7 (—O—CH$_2$C$\underline{H_2}$CH$_2$—Si, C—CH$_2$C$\underline{H_2}$C$\underline{H_2}$CH$_2$—Si) 8H
δ 3.4-3.6 (C$\overline{F_2}$—C$\underline{H}$(—O—CH$_2$CH$_2$CH$_2$—Si)) 1H
δ 3.8-4.1 (—Si(C$\underline{H_3}$)$\underline{H}$) 2H In a reactor, 10 g (2.1×10⁻³ mol) of the compound having the formula (M):

[Chem. 69]

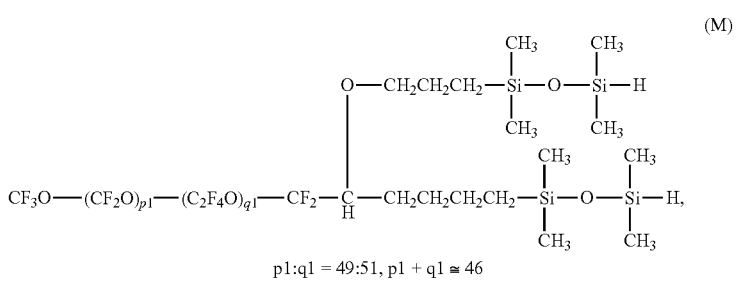

(M)

p1:q1 = 49:51, p1 + q1 ≅ 46

10 g of 1,3-bis(trifluoromethyl)benzene, 1.3 g ($8.4 \times 10^{-3}$ mol) of allyltrimethoxysilane, and $1.0 \times 10^{-2}$ g of a toluene solution of chloroplatinic acid/vinyl siloxane complex (containing $3.0 \times 10^{-8}$ mol of Pt) were mixed. The solution was aged at 80° C. for 24 hours. Thereafter, the solvent and unreacted reactants were distilled off in vacuum, obtaining 10 g of a liquid product.

On $^1$H-NMR analysis, the compound was identified to have a structure of the following formula (N).

[Chem. 70]

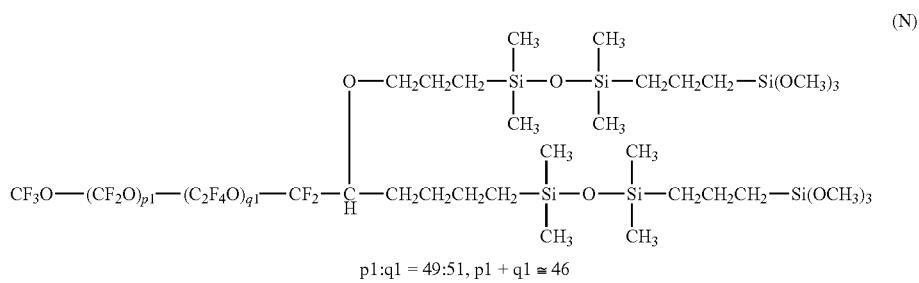

(N)

$p1:q1 = 49:51, p1 + q1 \cong 46$ $^1$H-NMR
δ 0-0.3 (—Si—(C$\underline{H}_3$)$_2$-) 24H
δ 0.4-0.7 (—O—CH$_2$CH$_2$C$\underline{H}_2$—Si, C—CH$_2$CH$_2$CH$_2$C$\underline{H}_2$—Si, Si—C$\underline{H}_2$CH$_2$CH$_2$—Si) 12H
δ 1.2-1.8 (—O—CH$_2$C$\underline{H}_2$CH$_2$—Si, C—C$\underline{H}_2$C$\underline{H}_2$C$\underline{H}_2$CH$_2$—SiSi—CH$_2$C$\underline{H}_2$CH$_2$—Si) 12H
δ 3.4-3.5 (CF$_2$—C$\underline{H}$(—O—CH$_2$CH$_2$CH$_2$—Si)) 1H
δ 3.3-3.7 (—O—C$\underline{H}_2$CH$_2$CH$_2$—Si, —Si(OC$\underline{H}_3$)$_3$) 20H Example 5

A reactor was charged with 282 ml of a 0.5 M THF solution of 3-butenylmagnesium bromide ($1.4 \times 10^{-1}$ mol). With stirring, a mixture of 100 g ($2.4 \times 10^{-2}$ mol) of a compound having the formula (O):

[Chem. 71]

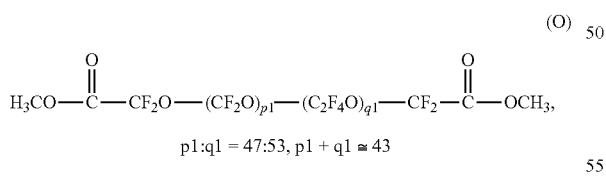

(O)

$p1:q1 = 47:53, p1 + q1 \cong 43$ 200 g of Asahiklin AC-6000, and 100 g of PF5060 was added dropwise to the reactor, which was heated at 50° C. for 6 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 94 g of a fluoropolyether-containing polymer (number average molecular weight about 4,400) having the following formula (P).

[Chem. 72]

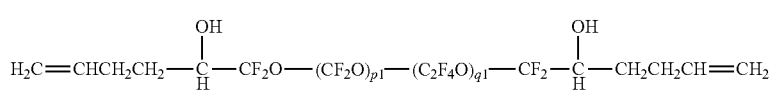

p1:q1 = 47:53, p1 + q1 ≅ 43

¹H-NMR
δ 1.4-1.7 (C—C$\underline{H_2}$CH$_2$CH═CH$_2$) 4H
δ 1.9-2.2 (C—C$\underline{H_2}$CH$_2$CH═CH$_2$, —CF$_2$—CH(OH)—CH$_2$—) 6H
δ 3.6-3.8 (—CF$_2$—C$\underline{H}$(OH)—CH$_2$—) 2H
δ 4.8-4.9 (—CH$_2$CH═C$\underline{H_2}$) 4H
δ 5.5-5.6 (—CH$_2$C$\underline{H}$═CH$_2$) 2H In a reactor, 20 g ($4.5 \times 10^{-3}$ mol) of the compound having the formula (P):

[Chem. 73]

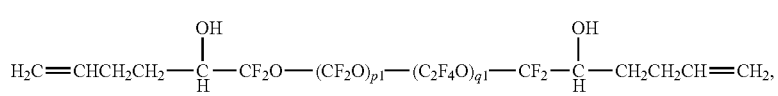

p1:q1 = 47:53, p1 + q1 ≅ 43

4.4 g ($3.6 \times 10^{-2}$ mol) of allyl bromide, and 0.06 g ($1.8 \times 10^{-4}$ mol) of tetrabutylammonium iodide were mixed. Subsequently, 7.2 g ($5.4 \times 10^{-2}$ mol) of 30 wt % sodium hydroxide aqueous solution was added. The solution was heated at 50° C. for 24 hours. At the end of heating, the solution was cooled to room temperature, and aqueous hydrochloric acid was added dropwise. The lower layer or fluoro compound layer was recovered by separatory operation and washed with acetone. The lower layer or fluoro compound layer after washing was recovered again. The residual solvent was distilled off in vacuum, yielding 21 g of a fluoropolyether-containing polymer having the following formula (Q).

[Chem. 74]

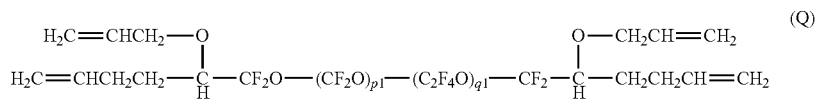

p1:q1 = 47:53, p1 + q1 ≅ 43

¹H-NMR
δ 1.5-1.7 (C—C$\underline{H_2}$CH$_2$CH═CH$_2$) 4H
δ 1.9-2.1 (C—C$\underline{H_2}$CH$_2$CH═CH$_2$) 4H
δ 3.4-3.5 (CF$_2$—C$\underline{H}$(OCH$_2$CH═CH$_2$)) 2H
δ 3.8-3.9 (CF$_2$—C$\underline{H}$(OCH$_2$CH═CH$_2$)) 2H
δ 4.1-4.2 (CF$_2$—CH(OC$\underline{H_2}$CH═CH$_2$)) 2H
δ 4.8-4.9 (CF$_2$—CH(OCH$_2$CH═C$\underline{H_2}$)) 4H
δ 5.0-5.2 (C—CH$_2$CH$_2$CH═C$\underline{H_2}$) 4H
δ 3.4-3.5 (CF$_2$—CH(OCH$_2$C$\underline{H}$═CH$_2$)) 2H
δ 5.7-5.8 (C—CH$_2$CH$_2$C$\underline{H}$═CH$_2$) 2H In a reactor, 20 g ($4.5 \times 10^{-3}$ mol) of the compound having the formula (Q):

[Chem. 75]

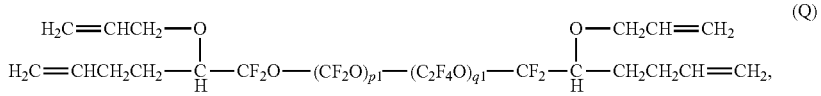

p1:q1 = 47:53, p1 + q1 ≅ 43

20 g of 1,3-bis(trifluoromethyl)benzene, 4.4 g ($3.6 \times 10^{-2}$ mol) of trimethoxysilane, and $4.8 \times 10^{-2}$ g of a toluene solution of chloroplatinic acid/vinyl siloxane complex (containing $1.4 \times 10^{-7}$ mol of Pt) were mixed. The solution was aged at 80° C. for 24 hours. Thereafter, the solvent and unreacted reactants were distilled off in vacuum, obtaining 20 g of a liquid product.

On $^1$H-NMR analysis, the compound was identified to have a structure of the following formula (R).

[Chem. 76]

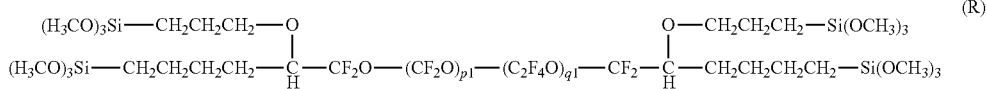

p1:q1 = 47:53, p1 + q1 ≅ 43

$^1$H-NMR
δ 0.4-0.6 (—O—CH$_2$CH$_2$C$\underline{H}_2$—Si, C—CH$_2$CH$_2$CH$_2$C$\underline{H}_2$—Si) 8H
δ 1.2-1.7 (—O—CH$_2$C$\underline{H}_2$CH$_2$—Si, C—C$\underline{H}_2$C$\underline{H}_2$C$\underline{H}_2$CH$_2$—Si) 16H
δ 3.4-3.5 (CF$_2$—C$\underline{H}$(—O—CH$_2$CH$_2$CH$_2$—Si)) 2H
δ 3.3-3.7 (—O—C$\underline{H}_2$CH$_2$CH$_2$—Si, —Si(OC$\underline{H}_3$)$_3$) 40H For comparison, the following polymers were used.

Comparative Example 1

[Chem. 77]

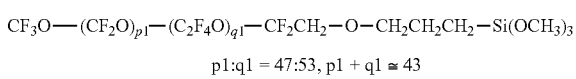

p1:q1 = 47:53, p1 + q1 ≅ 43

Comparative Example 2

[Chem. 78]

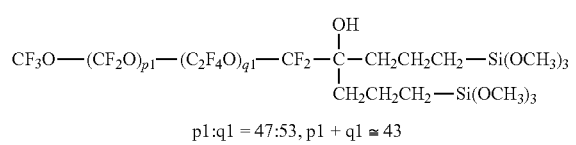

p1:q1 = 47:53, p1 + q1 ≅ 43

Preparation of Surface Treating Agent and Formation of Cured Film

Surface treating agents were prepared by dissolving the fluoropolyether-containing polymers of the structure having formulae (D) and (G) obtained in Examples 1 and 2 or the polymers having formulae (S) and (T) in Comparative Examples 1 and 2 in Novec 7200 (ethyl perfluorobutyl ether by 3M) in a concentration of 20 wt %. Onto glass having an outermost surface treated with SiO$_2$ of 10 nm (Gorilla by Corning), 4 µl of each surface treating agent was deposited by vacuum evaporation under conditions including pressure $3.0 \times 10^{-3}$ Pa and heating temperature 500° C. The deposit was cured in an atmosphere of 25° C. and humidity 50% for 12 hours, obtaining a cured film of 8 nm thick.

Evaluation of Water/Oil Repellency

[Evaluation of Initial Water/Oil Repellency]

Using a contact angle meter Drop Master (Kyowa Interface Science Co., Ltd.), the cured film on glass was measured for a contact angle with water as an index of water repellency (droplet 2 temperature 25° C., humidity 40%). The results (initial contact angle with water) are shown in Table 1.

At the initial, all the films of Examples and Comparative Examples showed excellent water repellency.

[Evaluation of Abrasion Resistance]

Using a friction tester (Shinto Scientific Co., Ltd.), the cured film on glass was rubbed 10,000 cycles under the conditions shown below. Thereafter, the cured film was similarly measured for a contact angle with water (water repellency) as an index of abrasion resistance. The test environmental conditions included temperature 25° C. and humidity 40%. The results (contact angle with water after abrasion) are shown in Table 1.

Steel Wool Abrasion Resistance
Steel wool: BONSTER #0000
Contact area: 1 cm$^2$
Moving distance (one way): 40 mm
Moving speed: 4,800 mm/min
Load: 1 kg/1 cm$^2$

TABLE 1

| | Initial contact angle with water (°) | Contact angle with water after abrasion (°) |
|---|---|---|
| Example 1 | 117 | 111 |
| Example 2 | 115 | 110 |
| Comparative Example 1 | 115 | 85 |
| Comparative Example 2 | 114 | 113 |

The polymers of Examples 1 and 2 and Comparative Example 2, which contain at least two reactive groups capable of adhering to substrate, tightly adhered to the substrate and maintained a contact angle with water of at least 110° even after 10,000 cycles of steel wool abrasion. In contrast, the polymer of Comparative Example 1, which contain only one reactive group, failed to display durability as seen from a contact angle with water of less than 100° after 10,000 cycles of steel wool abrasion.

[Evaluation of Water Sliding]

Using a contact angle meter Drop Master (Kyowa Interface Science Co., Ltd.), the cured film on glass was evaluated for water sliding properties. The results (initial water sliding angle) are shown in Table 2.

Water Sliding
Droplets: 5 µl, 10 µl, 15 µl, 20 µl
Moving judgment distance: 0.0536 mm
Inclination mode: continuous
Test number: 8 times (average value is taken)

TABLE 2

| | Initial water sliding angle (°) | | | |
|---|---|---|---|---|
| Droplet size (µl) | 5 | 10 | 15 | 20 |
| Example 1 | 18 | 14 | 14 | 12 |
| Example 2 | 20 | 18 | 15 | 15 |
| Comparative Example 1 | 10 | 12 | 15 | 11 |
| Comparative Example 2 | 42 | 30 | 28 | 24 |

The polymers of Examples 1 and 2 and Comparative Example 1, which do not contain a polar group, showed satisfactory water sliding properties as seen from a water sliding angle of up to 20° for droplet size 5 µl and a water sliding angle of up to 15° for droplet size 20 µl. In contrast, the polymer of Comparative Example 2, which contains a polar group, showed a large water sliding angle as seen from a water sliding angle in excess of 20° for droplet size 20 µl.

The invention claimed is:

1. A fluoropolyether-containing polymer having the general formula (1):

$$Rf-[CH(V)_2]_\alpha \quad (1)$$

wherein Rf is a mono- or divalent fluoropolyether group, V is independently a monovalent group having a hydroxy-containing silyl group or hydrolyzable silyl group at an end, but not any polar group other than the hydroxy-containing silyl group and hydrolyzable silyl group, and α is 1 or 2.

2. The fluoropolyether-containing polymer of claim 1, having the general formula (2):

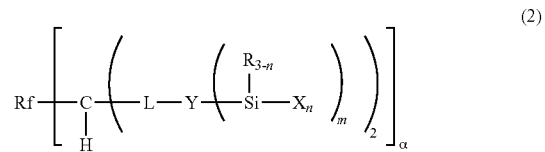

wherein Rf is a mono- or divalent fluoropolyether group, L is each independently a single bond or divalent heteroatom, Y is each independently a di- to hexavalent hydrocarbon group which may contain a silicon atom and/or siloxane bond, R is independently $C_1$-$C_4$ alkyl or phenyl, X is independently a hydroxy or hydrolyzable group, n is an integer of 1 to 3, m is an integer of 1 to 5, and α is 1 or 2.

3. The fluoropolyether-containing polymer of claim 1 wherein in formula (1) or (2), α is 1, and Rf is a group having the general formula (3):

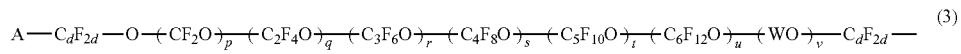

wherein A is fluorine, hydrogen, fluoroalkyl group or fluoroalkyl group containing at least one hydrogen atom, W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

4. The fluoropolyether-containing polymer of claim 1 wherein in formula (1) or (2), α is 2, and Rf is a group having the general formula (4):

wherein W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

5. The fluoropolyether-containing polymer of claim 2 wherein in formula (2), two L are present at one end of the molecular chain when α=1, and two L are present at each of opposite ends of the molecular chain when α=2; one L at each end of the molecular chain is an oxygen atom, and the other L is a single bond, and Y is each independently a group selected from the group consisting of a $C_3$-$C_{10}$ alkylene group, an alkylene group containing $C_6$-$C_8$ arylene, a divalent group having alkylene moieties bonded via a silalkylene structure or silarylene structure, a di- to tetravalent group having a $C_2$-$C_{10}$ alkylene moiety bonded to the valence bond of a di- to tetravalent linear organopolysiloxane residue of 2 to 10 silicon atoms, and a di- to tetravalent group having a $C_2$-$C_{10}$ alkylene moiety bonded to the valence bond of a di- to tetravalent branched or cyclic organ-opolysiloxane residue of 3 to 10 silicon atoms.

6. The fluoropolyether-containing polymer of claim 2 wherein in formula (2), X is each independently selected from the group consisting of hydroxy, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

7. The fluoropolyether-containing polymer of claim 2 wherein the polymer having formula (2) is selected from those polymers having the following formulae:

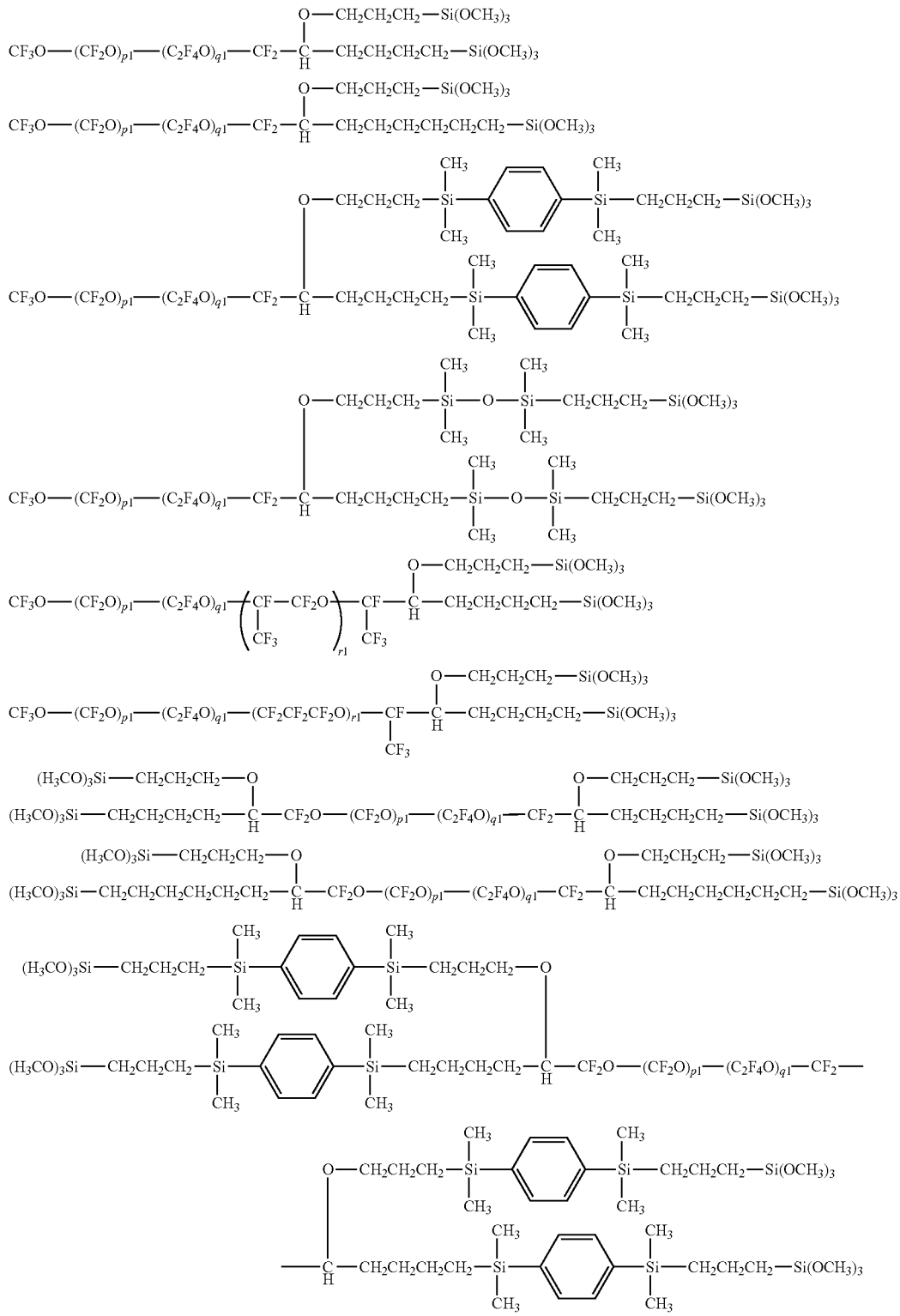

-continued

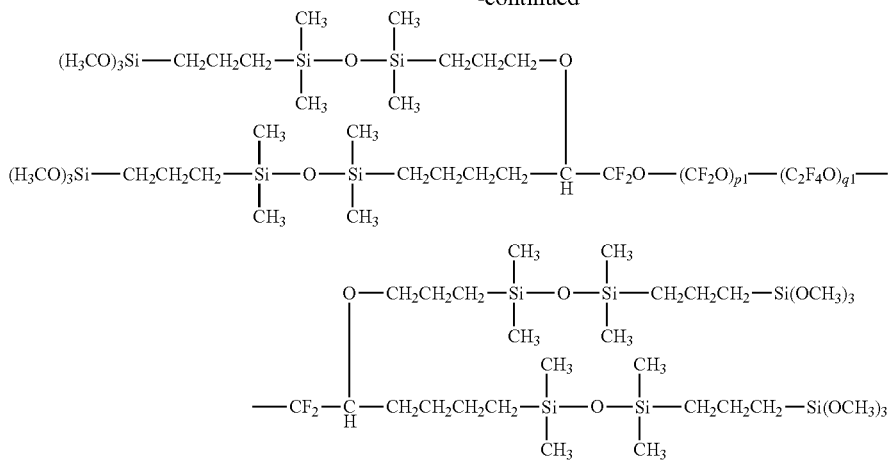

[Chem. 7]

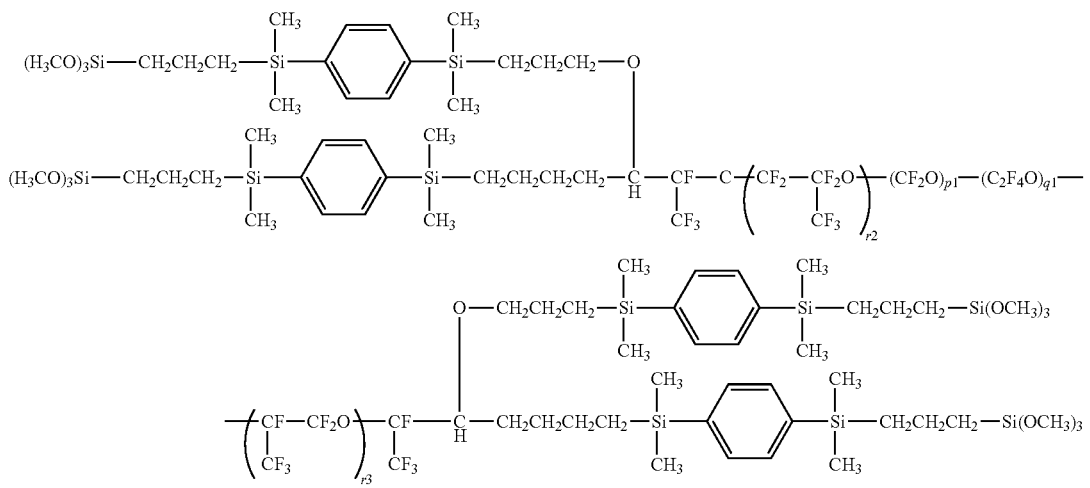

wherein p1 is an integer of 5 to 100, q1 is an integer of 5 to 100, r1 is an integer of 1 to 100, r2 is an integer of 1 to 99, r3 is an integer of 1 to 99, the sum of p1, q1, r1, r2 and r3 is an integer of 10 to 110, and individual repeating units within the parentheses with p1, q1, r1, r2, and r3 may be randomly bonded.

8. A surface treating agent comprising the fluoropolyether-containing polymer of claim 1 and/or a partial (hydrolytic) condensate thereof.

9. The surface treating agent of claim 8 wherein the fluoropolyether group in the fluoropolyether-containing polymer is a monovalent fluoropolyether group at a molecular chain end.

10. An article having a surface treated with the surface treating agent of claim 8.

11. The surface treating agent of claim 8 wherein in formula (1), when α is 1, Rf is a fluoropolyether group having the general formula (3):

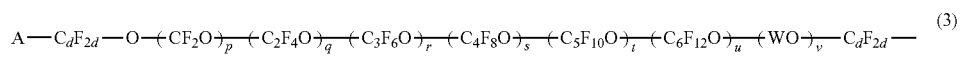

(3)

wherein A is fluorine, hydrogen, fluoroalkyl group or fluoroalkyl group containing at least one hydrogen atom, W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

12. The surface treating agent of claim 8 wherein in formula (1), when α is 2, Rf is a fluoropolyether group having the general formula (4):

(4)

wherein W is a $C_1$-$C_6$ fluoroalkylene group containing at least one hydrogen atom, d is each independently an integer of 1 to 3, p, q, r, s, t, u and v each are an integer of 0 to 200, p+q+r+s+t+u+v is 3 to 200, each of the units associated with p, q, r, s, t, u and v may be linear or branched, and individual repeating units within the parentheses with p, q, r, s, t, u and v may be randomly bonded.

13. The surface treating agent of claim 8 wherein in formula (1), V is a monovalent group selected from the groups having the following formulae (5a) to (5e):

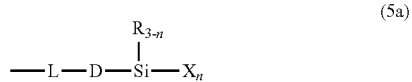
(5a)

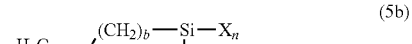
(5b)

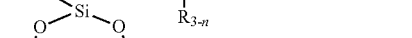

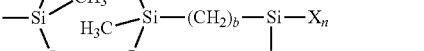
(5c)

(5d)

(5e)
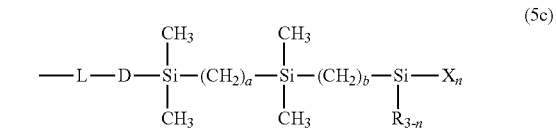

wherein, L is a single bond or divalent heteroatom, D is a $C_1$-$C_{20}$ divalent organic group which may be fluorinated, R is each independently $C_1$-$C_4$ alkyl group or phenyl group, X is each independently a hydroxy group or hydrolyzable group, n is an integer of 1 to 3, "a" is an integer of 2 to 6, b is independently an integer of 2 to 8, and c is an integer of 1 to 50.

14. The surface treating agent of claim 8 wherein the fluoropolyether-containing polymer is represented by the general formula (2):

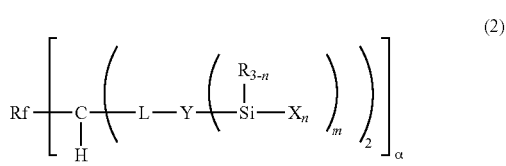

(2)

wherein Rf is a mono- or divalent fluoropolyether group, L is each independently a single bond or divalent heteroatom, Y is each independently a di- to hexavalent hydrocarbon group which may contain a silicon atom and/or siloxane bond, R is independently $C_1$-$C_4$ alkyl or phenyl, X is independently a hydroxy or hydrolyzable group, n is an integer of 1 to 3, m is an integer of 1 to 5, and α is 1 or 2.

15. The surface treating agent of claim 14 wherein in formula (2), two L are present at one end of the molecular chain when α=1, and two L are present at each of opposite ends of the molecular chain when α=2; one L at each end of the molecular chain is an oxygen atom, and the other L is a single bond, and Y is each independently a group selected from the group consisting of a $C_3$-$C_{10}$ alkylene group, an alkylene group containing $C_6$-$C_8$ arylene, a divalent group having alkylene moieties bonded via a silalkylene structure or silarylene structure, a di- to tetravalent group having a $C_2$-$C_{10}$ alkylene moiety bonded to the valence bond of a di- to tetravalent linear organopolysiloxane residue of 2 to 10 silicon atoms, and a di- to tetravalent group having a $C_2$-$C_{10}$ alkylene moiety bonded to the valence bond of a di- to tetravalent branched or cyclic organopolysiloxane residue of 3 to 10 silicon atoms.

16. The surface treating agent of claim 14 wherein in formula (2), Y is each independently a divalent hydrocarbon group which may contain a silicon atom and/or siloxane bond.

17. The surface treating agent of claim 14 wherein in formula (2), X is each independently selected from the group consisting of hydroxy, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

18. The surface treating agent of claim 14 wherein the polymer having formula (2) is selected from those polymers having the following formulae:

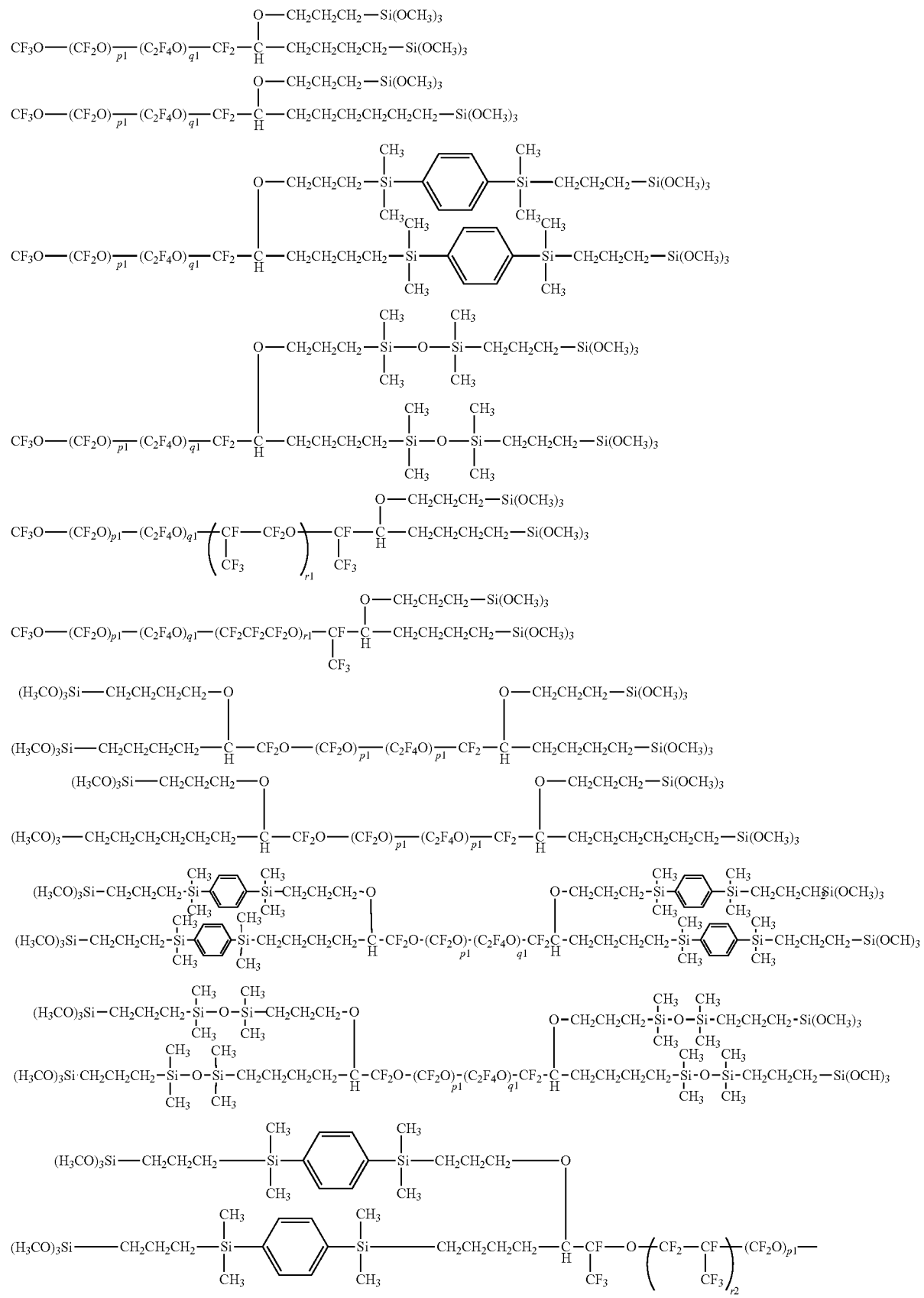

-continued
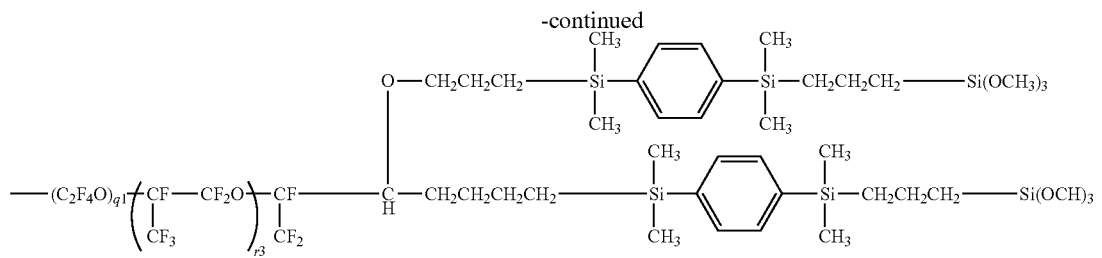
wherein p1 is an integer of 5 to 100, q1 is an integer of 5 to 100, r1 is an integer of 1 to 100, r2 is an integer of 1 to 99, r3 is an integer of 1 to 99, the sum of p1, q1, r1, r2 and r3 is an integer of 10 to 110, and individual repeating units within the parentheses with p1, q1, r1, r2, and r3 may be randomly bonded.
* * * * *